(12) United States Patent
Yoshioka et al.

(10) Patent No.: US 11,008,983 B1
(45) Date of Patent: May 18, 2021

(54) EGR GAS DISTRIBUTOR

(71) Applicant: AISAN KOGYO KABUSHIKI KAISHA, Obu (JP)

(72) Inventors: Mamoru Yoshioka, Nagoya (JP); Kaisho So, Nagoya (JP); Eiji Nakamura, Handa (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/108,581

(22) Filed: Dec. 1, 2020

(30) Foreign Application Priority Data

Dec. 27, 2019 (JP) .............................. JP2019-238525

(51) Int. Cl.
*F02M 26/19* (2016.01)
*F02M 35/10* (2006.01)

(52) U.S. Cl.
CPC ...... *F02M 26/19* (2016.02); *F02M 35/10222* (2013.01)

(58) Field of Classification Search
CPC .. F02M 26/19; F02M 35/10222; F02M 26/13; F02M 26/17; F02M 26/50
See application file for complete search history.

(56) References Cited

U.S. PATENT DOCUMENTS

| 2015/0377186 | A1* | 12/2015 | Blanchard | F02M 35/10222 123/542 |
| 2017/0211519 | A1* | 7/2017 | Ito | F02M 35/104 |
| 2018/0283325 | A1* | 10/2018 | Nagata | F02M 35/112 |

FOREIGN PATENT DOCUMENTS

| JP | 2013-019315 A | 1/2013 |
| JP | 2013-068129 A | 4/2013 |
| JP | 2018-076843 A | 5/2018 |
| JP | 2019-129367 A | 8/2019 |

* cited by examiner

*Primary Examiner* — Jacob M Amick
(74) *Attorney, Agent, or Firm* — Oliff PLC

(57) ABSTRACT

An EGR gas distributor for distributing EGR gas to each of branch pipes of an intake manifold includes a gas chamber, a gas inflow passage, and a plurality of gas distribution passages. The inner wall of the gas chamber on a downstream side is divided into a plurality of downstream divided walls corresponding to the gas distribution passages. On the boundary between adjacent two of the downstream divided walls, a downstream ridge is provided in a perpendicular direction to the arrangement direction of the gas distribution passages. The downstream ridges are arranged side by side in number corresponding to the number of gas distribution passages. The downstream ridges each include a side surface in the arrangement direction. The downstream ridges are different in at least one of height and inclination angle of the side surface according to the positions of the downstream ridges.

6 Claims, 24 Drawing Sheets

EGR GAS DISTRIBUTOR

CROSS-REFERENCE TO RELATED APPLICATIONS

This application is based upon and claims the benefit of priority from Japanese Patent Application No. 2019-238525 filed on Dec. 27, 2019, the entire contents of which are incorporated herein by reference.

BACKGROUND

Technical Field

The present disclosure relates to an EGR gas distributor to be mounted on an intake manifold to distribute EGR gas to a plurality of cylinders of an engine.

Related Art

As the above-mentioned type of technique, for example, there has been known an exhaust introduction structure for air intake disclosed in Japanese unexamined patent application publication No. 2013-68129 (JP 2013-68129A). This structure includes an EGR chamber (a gas chamber) into which exhaust gas of an engine having a plurality of cylinders is introduced, and exhaust gas distribution passages (gas distribution passages) provided, one for each cylinder, and configured to distribute exhaust gas from the gas chamber to an intake path of each cylinder. The gas chamber is provided, on its inner surface, with a plurality of ridges extending in a direction perpendicular to an arrangement direction in which openings of the gas distribution passages are arranged. Some of those ridges are each formed, on their side surfaces, with a protruding part spaced apart with a gap from the inner surface of the EGR chamber.

SUMMARY

Technical Problem

Meanwhile, the structure disclosed in JP 2013-68129A is configured to retain condensed water generated in the gas chamber between the plurality of ridges. Accordingly, this structure prevents the condensed water from unevenly flowing in a specified one or ones of the cylinders even if centrifugal force and inertia force act on this structure when a vehicle turns, accelerates, or decelerates. In JP 2013-68129A, however, the height and the shape of each ridge have not been studied in detail. Furthermore, as shown in a cross-sectional view in FIG. 26, condensed water Wc may be saturated between the ridges 56. If the condensed water Wc is saturated, as the centrifugal force and others in a direction indicated by an arrow F2 change (increase) when a vehicle is quickly or suddenly turned, the condensed water Wc may flow or climb over the ridge(s) 56, overflowing to an opposite side, as shown in a cross-sectional view in FIG. 27, and the overflowing condensed water Wc may move at once to flow out into a specified one or ones of the cylinders. FIGS. 26 and 27 are cross-sectional views showing a relationship between the ridge(s) 56 provided on the inner surface of the EGR chamber and condensed water Wc.

The present disclosure has been made to address the above problems and has a purpose to provide an EGR gas distributor to be mounted in a vehicle, the EGR gas distributor being configured to prevent condensed water in a gas chamber from moving at once in a direction of centrifugal force and inertia force to flow out into a specified one or ones of cylinders even when the centrifugal force and the inertia force act on the EGR gas distributor and further the centrifugal force and the inertia force change in e.g. magnitude or direction.

Means of Solving the Problem

To achieve the above purpose, one aspect of the present disclosure provides an EGR gas distributor configured to distribute EGR gas to each of a plurality of branch pipes constituting an intake manifold, the EGR gas distributor comprising: a gas chamber configured to collect EGR gas; a gas inflow passage provided on an upstream side of the gas chamber and configured to introduce EGR gas into the gas chamber; a plurality of gas distribution passages arranged side by side on a downstream side of the gas chamber and configured to distribute the EGR gas from the gas chamber into the plurality of branch pipes, the gas chamber including an inner wall on the downstream side, the inner wall being divided into a plurality of downstream divided walls corresponding to the plurality of gas distribution passages in a one-to-one relation, and the inner wall including a plurality of ridges each having a predetermined height at a boundary between adjacent two of the downstream divided walls, and the ridges extending in a direction perpendicular to an arrangement direction of the gas distribution passages, wherein the plurality of ridges are arranged side by side according to the number of the gas distribution passages, each of the ridges including side surfaces inclined at a predetermined inclination angle in an arrangement direction of the ridges, the ridges being different from each other in at least one of the height and the inclination angle of the side surfaces according to positions of the ridges in the arrangement direction.

According to the above-described configuration, even if the EGR gas distributor when mounted in a vehicle is subjected to centrifugal force and inertia force that act for example when the vehicle turns, and further those forces change in e.g. magnitude or direction, the EGR gas distributor can restrain condensed water in the gas chamber from moving at once in a direction of those forces, thereby preventing the condensed water from flowing in a specified one or ones of the gas distribution passages to flow out into a specified one or ones of cylinders of an engine.

DETAILED DESCRIPTION OF THE EXEMPLARY EMBODIMENTS

First Embodiment

A detailed description of a first embodiment of an EGR gas distributor according to the present disclosure will now be given referring to the accompanying drawings.

(Intake Manifold)

Figure 1:
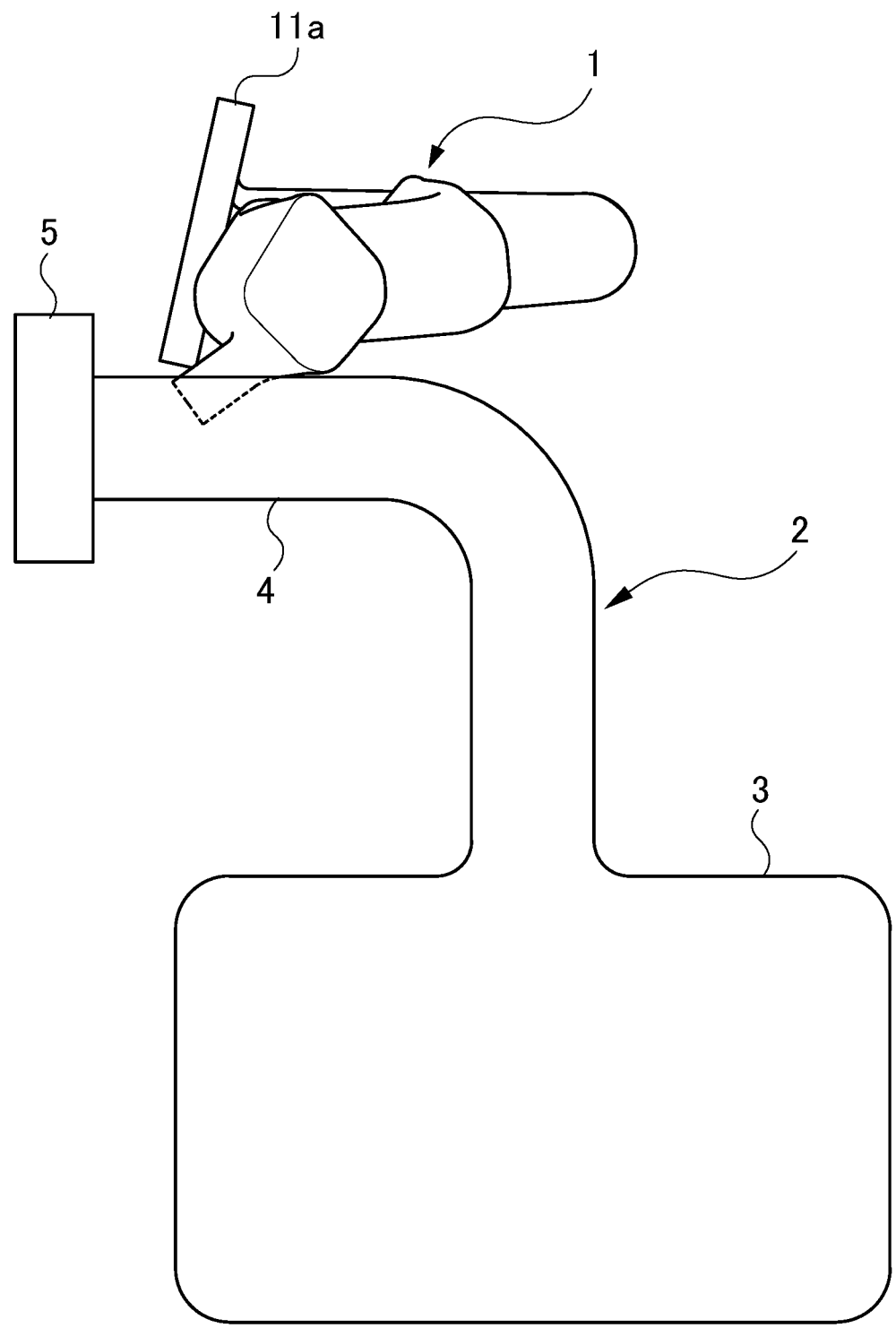
FIG. 1 is a schematic side view of an intake manifold provided with an EGR gas distributor in a first embodiment.

FIG. 1 is a schematic side view of an intake manifold 2 provided with an EGR gas distributor 1 in the first embodiment. Herein, the posture of the intake manifold 2 illustrated in FIG. 1 indicates the state of the intake manifold 2 when mounted in an engine of a vehicle so that the top and bottom of the intake manifold 2 are oriented as shown in FIG. 1. The intake manifold 2 is provided with a surge tank 3, a plurality of branch pipes 4 (only one is shown) branched off from the surge tank 3, and an outlet flange 5 for connection of outlets of the branch pipes 4 to the engine. In the present embodiment, the intake manifold 2 includes four branch pipes 4 adapted for a 4-cylinder engine.

(EGR Gas Distributor)

Figure 2:
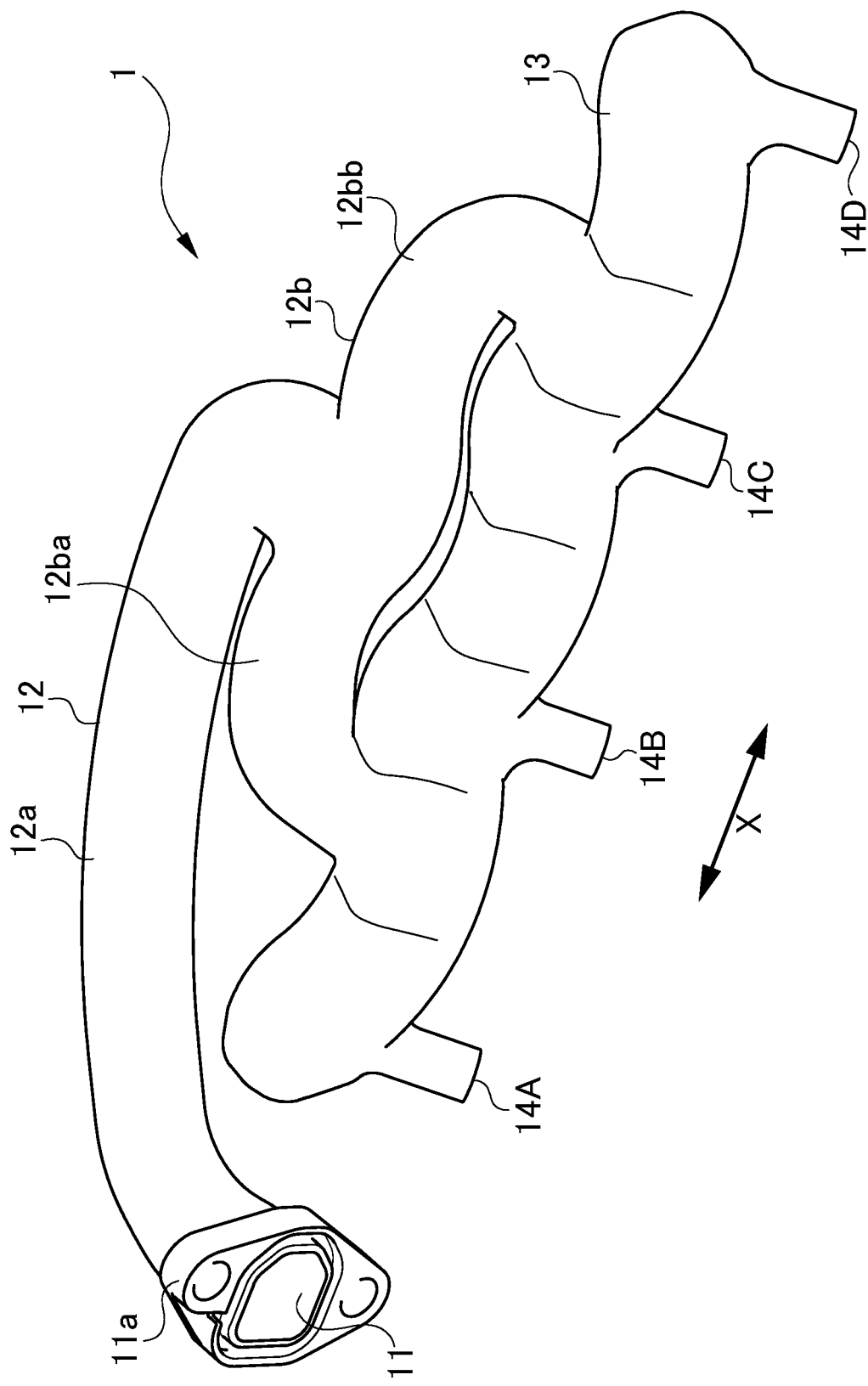
FIG. 2 is a perspective view of the EGR gas distributor seen from front in the first embodiment.
Figure 3:
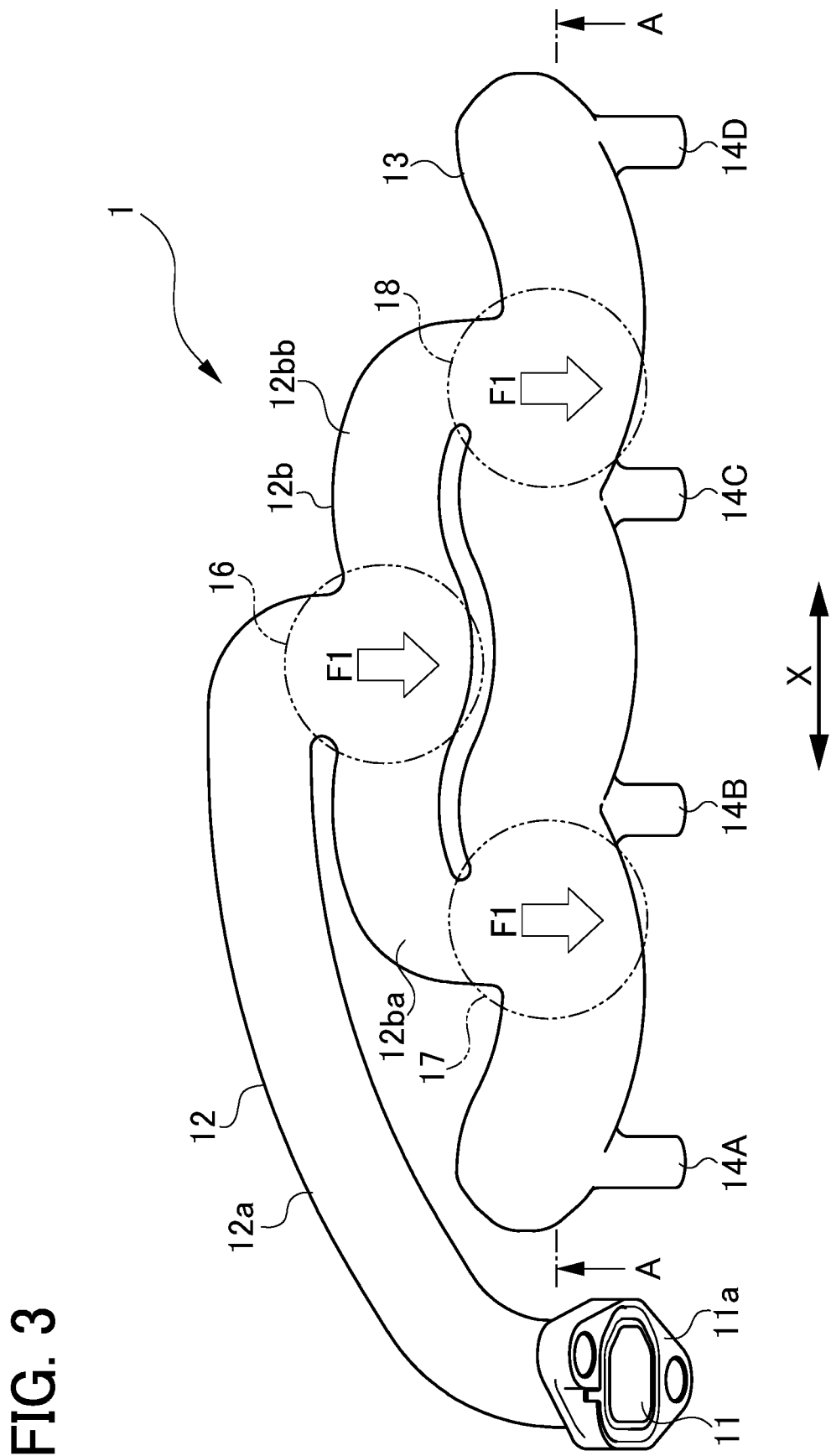
FIG. 3 is a plan view of the EGR gas distributor in the first embodiment.
Figure 4:
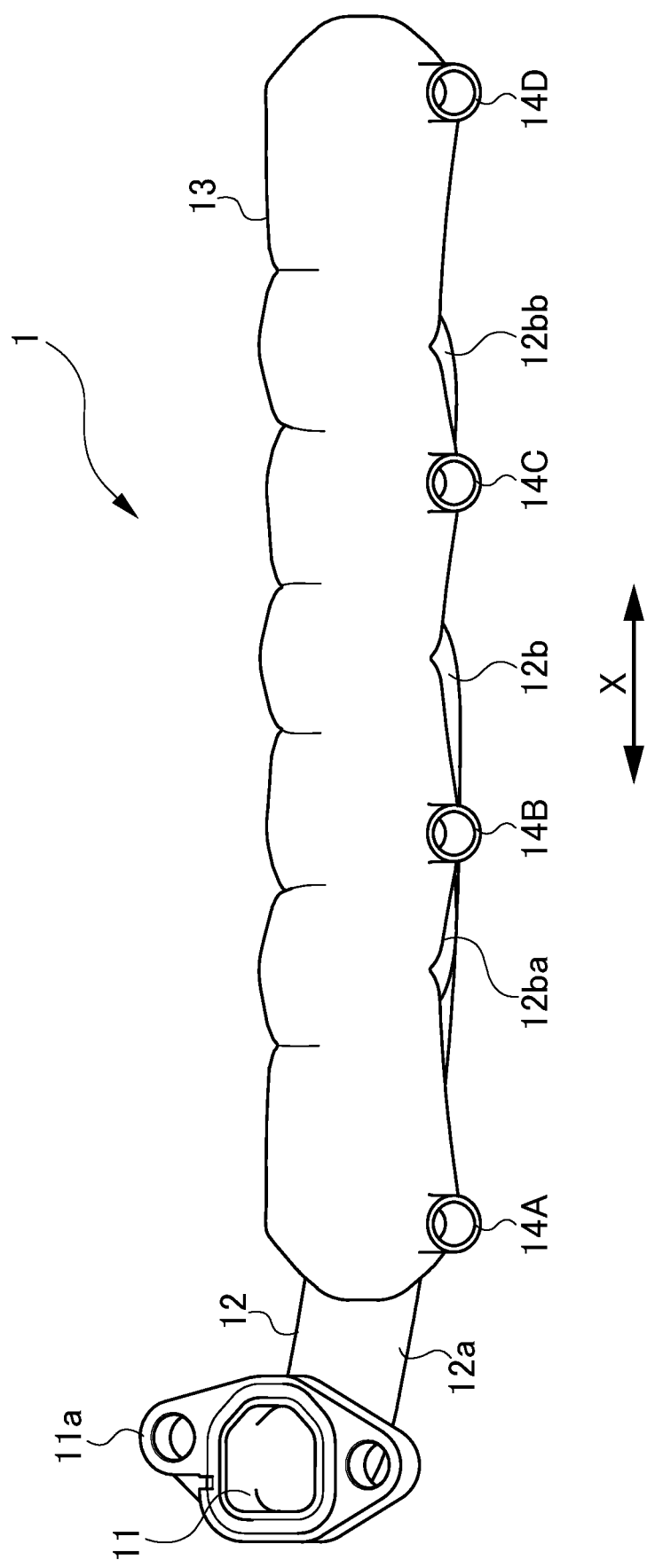
FIG. 4 is a front view of the EGR gas distributor in the first embodiment.
Figure 5:
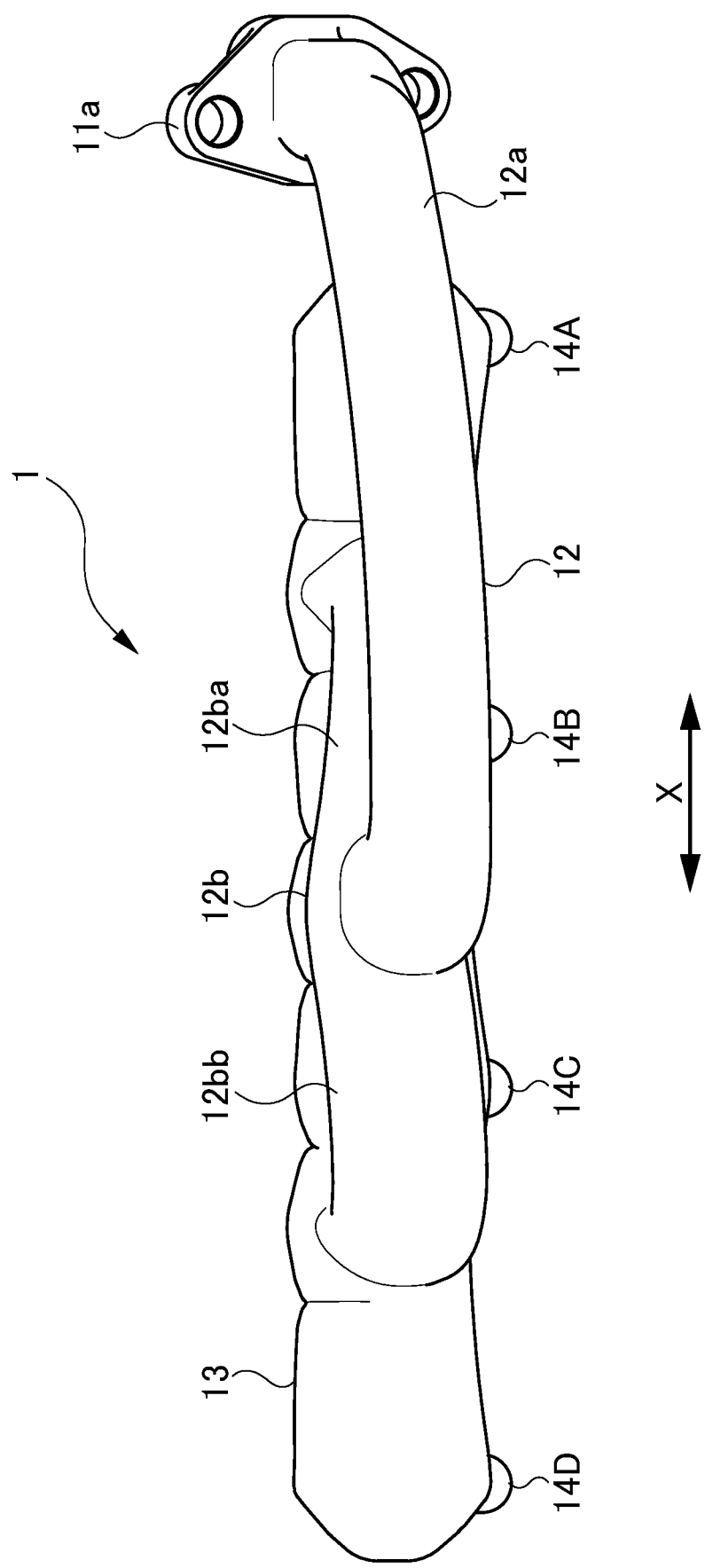
FIG. 5 is a back view of the EGR gas distributor in the first embodiment.
Figure 6:
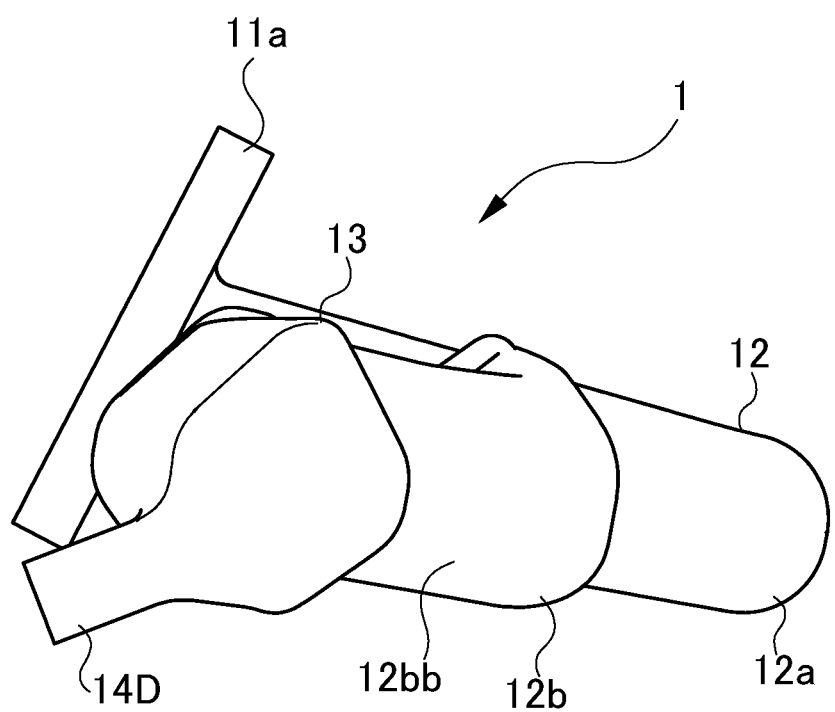
FIG. 6 is a right side view of the EGR gas distributor in the first embodiment.

In the present embodiment, as shown in FIG. 1, the EGR gas distributor 1 is placed near the outlet flange 5 and above the branch pipes 4 constituting the intake manifold 2 to distribute EGR gas to each of the branch pipes 4. FIG. 2 is a perspective view of the EGR gas distributor 1 seen from front. FIG. 3 is a plan view of the EGR gas distributor 1. FIG. 4 is a front view of the EGR gas distributor 1. FIG. 5 is a back view of the EGR gas distributor 1. FIG. 6 is a right side view of the EGR gas distributor 1. The outer shapes and configurations of the EGR gas distributor 1 and the intake manifold 2 shown in FIGS. 1 to 6 are merely one example of the present disclosure.

The EGR gas distributor 1 has a laterally long shape and is placed to extend across the plurality of branch pipes 4 of the intake manifold 2 in a longitudinal direction X of the EGR gas distributor 1 as shown in FIGS. 2 to 6. The EGR gas distributor 1 is produced in advance separately from the intake manifold 2 and then retrofitted onto the intake manifold 2. The EGR gas distributor 1 mainly includes three parts, that is, a gas inflow passage 12 including a gas inlet 11, a gas chamber 13 communicating with the gas inflow passage 12, and a plurality of gas distribution passages 14A, 14B, 14C, and 14D (four gas distribution passages in the present embodiment) branched off from the gas chamber 13 to communicate with the corresponding branch pipes 4. In this configuration, the gas chamber 13 has an inner diameter larger than that of the gas inflow passage 12, and each of the gas distribution passages 14A to 14D has an inner diameter smaller than those of the gas inflow passage 12 and the gas chamber 13. In the EGR gas distributor 1 in the present embodiment, the above components are integrally made of resin in one casing. In the present embodiment, the gas distribution passages 14A to 14D arranged side by side from the left in FIGS. 2 and 3 are configured to distribute EGR gas into and allow condensed water to flow into the branch pipes 4 corresponding to a first cylinder #1, a second cylinder #2, a third cylinder #3, and a fourth cylinder #4 of an engine. Specifically, the gas distribution passages 14A to 14D are provided in one-to-one correspondence to the cylinders #1 to #4.

The gas inflow passage 12 is branched off in order to allow EGR gas to flow to the plurality of gas distribution passages 14A to 14D. Specifically, the gas inflow passage 12 is connected to an upstream side of the gas chamber 13 to introduce EGR gas into the gas chamber 13. EGR gas is introduced from an EGR passage into the gas inlet 11. This gas inlet 11 is connected to the EGR passage (not shown). For this connection to the EGR passage, an inlet flange 11a is provided around the gas inlet 11. The gas inflow passage 12 includes a first gas passage part 12a extending from the gas inlet 11 and a second gas passage part 12b branched off in a bifurcated shape from the first gas passage part 12a. The second gas passage part 12b includes a first branch passage part 12ba and a second branch passage part 12bb. The gas inlet 11 opens on the front side of the EGR gas distributor 1. The first gas passage part 12a extends in a curve from the front side to the back side of the EGR gas distributor 1 and joins to the second gas passage part 12*b*. The gas chamber 13 has a tubular, laterally long shape.

The gas chamber 13 serves to collect EGR gas introduced into the gas inflow passage 12 through the gas inlet 11. The plurality of gas distribution passages 14A to 14D are arranged side by side and in parallel with each other on the front of the gas chamber 13 and branched off from the gas chamber 13. In the present embodiment, specifically, the gas distribution passages 14A to 14D are arranged side by side on a downstream side of the gas chamber 13 (i.e., a lower side in FIGS. 1 to 6) to distribute EGR gas from the gas chamber 13 to the branch pipes 4. Each of the gas distribution passages 14A to 14D extends at a slant obliquely downward from the gas chamber 13 to the corresponding branch pipes 4 and opens therein in order to distribute EGR gas to the branch pipes 4.

In the present embodiment, a downstream end of the first gas passage part 12*a* is connected to the second gas passage part 12*b* at a first joining portion (i.e., a circular portion enclosed by a two-dot chain line in FIG. 3) 16. A downstream end of the first branch passage part 12*ba* of the second gas passage part 12*b* is connected to the gas chamber 13 at a second joining portion (i.e., a circular portion enclosed by a two-dot chain line in FIG. 13) 17. Similarly, a downstream end of the second branch passage part 12*bb* is connected to the gas chamber 13 at a third joining portion (a circular portion enclosed by a two-dot chain line in FIG. 3) 18.

In the present embodiment, as shown in FIG. 3, paying attention to the first gas passage part 12*a* and the second gas passage part 12*b*, the second gas passage part 12*b* is placed so that a part of the second gas passage part 12*b* including the first joining portion 16 extends in an arrangement direction in which the gas distribution passages 14A to 14D are arranged, that is, in the longitudinal direction X, and further the first gas passage part 12*a* connects to the first joining portion 16 so as to be perpendicular to the second gas passage part 12*b*. Furthermore, the part of the second gas passage part 12*b* including the first joining portion 16 has a curved shape convexly protruding in a flowing direction (indicated by an arrow) F1 of EGR gas flowing from the first gas passage part 12*a*. Herein, the direction F1 points in the same direction as the extending direction of each of the gas distribution passages 14A to 14D. Thus, the part of the second gas passage part 12*b* extending in the longitudinal direction X has a shape bent in a substantially zigzag form in plan view.

As shown in FIG. 3, furthermore, paying attention to the second gas passage part 12*b* and the gas chamber 13, the gas chamber 13 is placed so that a part of the gas chamber 13 including the second joining portion 17 and the third joining portion 18 extends in the longitudinal direction X, and further the first branch passage part 12*ba* of the second gas passage part 12*b* connects to the second joining portion 17 and the second branch passage part 12*bb* of the second gas passage part 12*b* connects to the third joining portion 18 respectively so as to be perpendicular to the gas chamber 13. The part of the gas chamber 13 including the second joining portion 17 and the third joining portion 18 has a curved shape convexly protruding in the flowing direction F1 of EGR gas from the corresponding branch passage parts 12*ba* and 12*bb*. Thus, the entire gas chamber 13 has a shape bent in a substantially zigzag form in plan view.

(Configuration to Restrict Abrupt Movement of Condensed Water Due to Centrifugal Force and Inertia Force)

Figure 7:
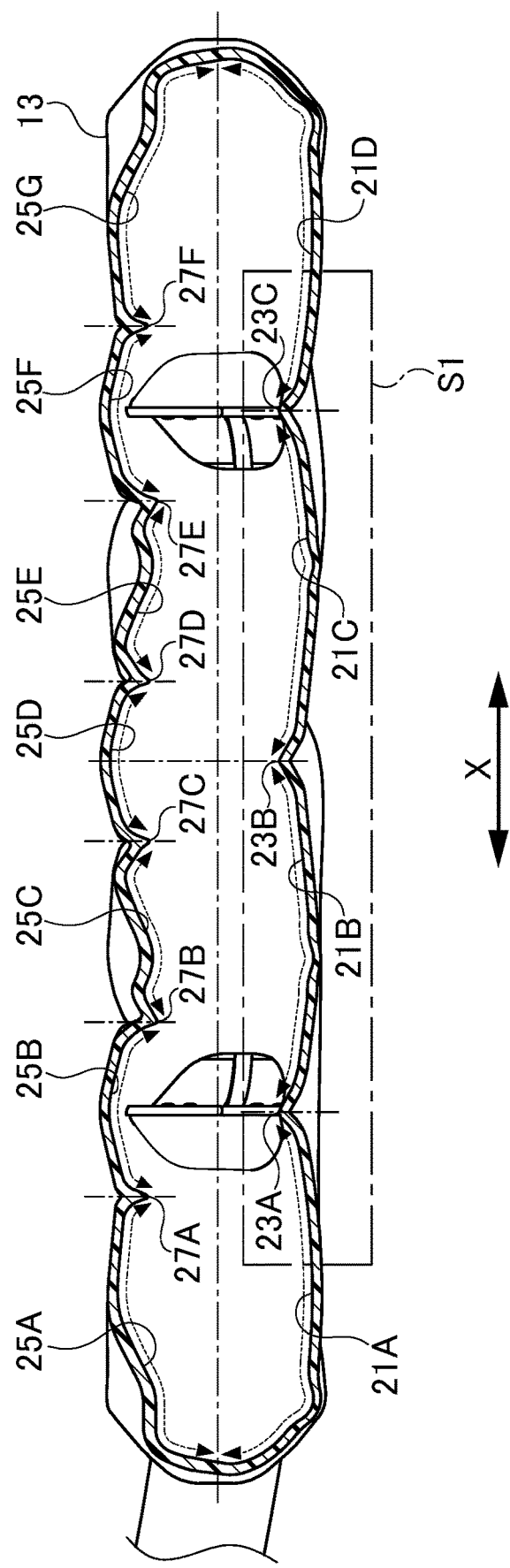
FIG. 7 is an A-A cross-sectional view of a gas chamber in FIG. 3 in the first embodiment.

The EGR gas distributor 1 in the present embodiment is provided with a configuration to restrict abrupt movement of condensed water due to centrifugal force and inertial force (i.e., lateral G (g-force)). FIG. 7 is a cross-sectional view of the gas chamber 13 taken along a line A-A in FIG. 3. In the present embodiment, as shown in FIG. 7, the inner wall of a downstream side of the gas chamber 13 (i.e., a lower side in FIG. 7) is divided into a plurality of (four) downstream divided walls 21A, 21B, 21C, and 21D (each having a range indicated by a double-headed dashed arrow in FIG. 7) corresponding to the gas distribution passages 14A, 14B, 14C, and 14D in a one-to-one relation. The downstream divided walls 21A to 21D are each sloped downward toward the inlets of the gas distribution passages 14A to 14D, respectively. The downstream divided walls 21A to 21D include a plurality of (three) downstream ridges 23A, 23B, and 23C each having a predetermined height and being located at the boundary between adjacent two of the downstream divided walls 21A to 21D. Those downstream ridges 23A to 23C are provided extending in a direction perpendicular to the longitudinal direction X which is the arrangement direction of the gas distribution passages 14A to 14D. Herein, the downstream ridges 23A to 23C are plurally arranged side by side in the longitudinal direction X according to the number of gas distribution passages 14A to 14D. In the present embodiment, the number of downstream ridges 23A to 23C arranged is lower by one than the number of gas distribution passages 14A to 14D; i.e., three downstream ridges 23A to 23C are provided for four gas distribution passages 14A to 14D.

As shown in FIG. 7, furthermore, the inner wall of an upstream side of the gas chamber 13 (i.e., an upper side in FIG. 7) is positioned opposite the downstream inner wall and is divided into a plurality of (seven) upstream divided walls (each having a range indicated by a double-headed dashed arrow in FIG. 7) 25A, 25B, 25C, 25D, 25E, 25F, and 25G which are different in number from the number of downstream divided walls 21A to 21D. Herein, some of the upstream divided walls 25A to 25G are located individually opposite the inlets of the gas distribution passages 14A to 14D. Each of the upstream divided walls 25A to 25G has a shape whose top protrudes to the outside (the upper side) of the gas chamber 13. The upstream divided walls 25A to 25G include a plurality of (six) upstream ridges 27A, 27B, 27C, 27D, 27E, and 27F each located at the boundary between adjacent two of the upstream divided walls 25A to 25G. Those upstream ridges 27A to 27F are provided in each range (defined by double-headed dashed arrows in FIG. 7) for the downstream divided walls 21A to 21D so as to protrude toward the downstream divided walls 21A to 21D so that the upstream ridges 27A to 27F are arranged in rows in the same direction as the downstream ridges 23A to 23C, i.e., in a side-by-side direction, or in a transverse direction. Further, as shown in FIG. 7, the upstream ridges 27A to 27F and the downstream ridges 23A to 23C are displaced from each other in the longitudinal direction X without exactly facing to each other in a vertical direction.

(Configuration of Downstream Ridge)

Figure 8:
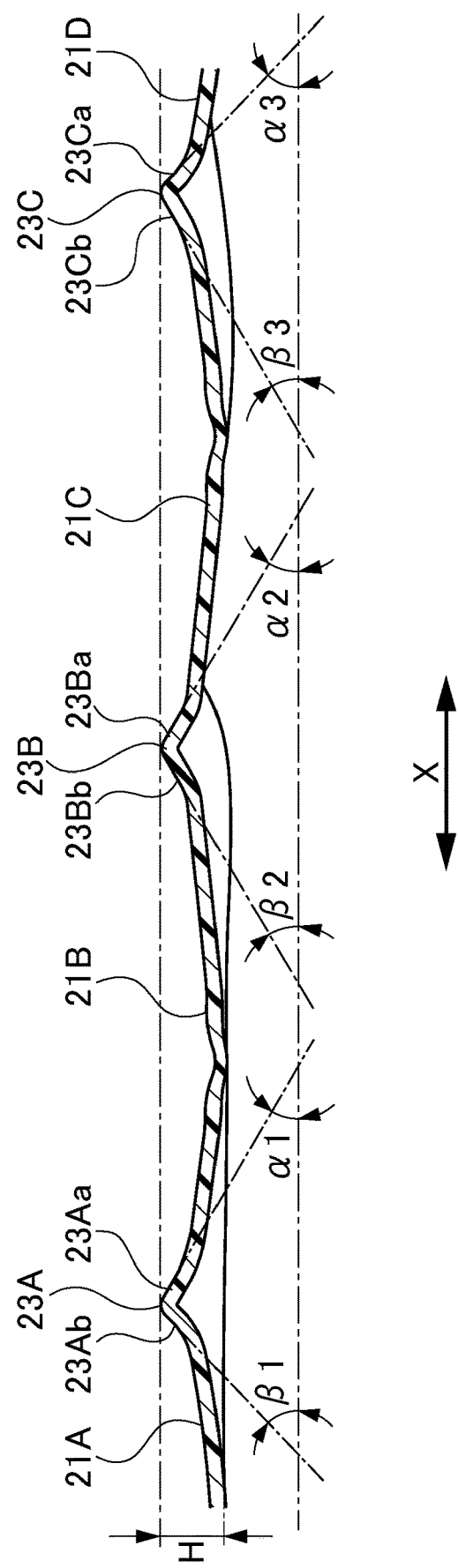
FIG. 8 is an enlarged cross-sectional view of a rectangular part of the gas chamber enclosed by a chain line in FIG. 7 in the first embodiment.
Figure 9:
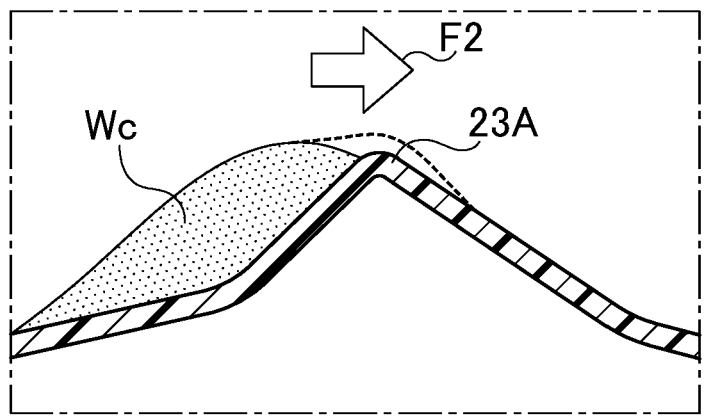
FIG. 9 is an enlarged cross-sectional view of a left downstream ridge in FIG. 8 in the first embodiment.
Figure 10:
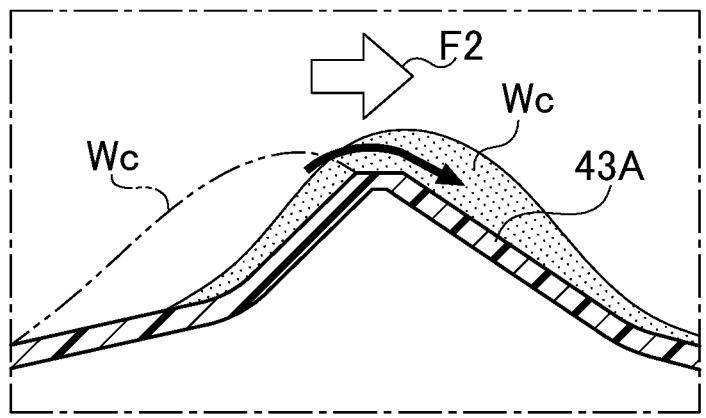
FIG. 10 is a cross-sectional view of a ridge in a comparative example to the first embodiment.

The configuration of the downstream ridges 23A to 23C will be described in detail hereinafter. FIG. 8 is an enlarged cross-sectional view of a rectangular part S1 of the gas chamber 13 enclosed by a chain line in FIG. 7. In the present embodiment, as shown in FIG. 8, the downstream ridges 23A to 23C include a downstream ridge 23A located on the left side (herein, referred to as a left downstream ridge), a downstream ridge 23B located in the center (herein, referred to as a central downstream ridge), and a downstream ridge 23C located on the right side (herein, referred to as a right downstream ridge). These downstream ridges 23A, 23B, and 23C include side surfaces 23Aa and 23Ab, side surfaces 23Ba and 23Bb, and side surfaces 23Ca and 23Cb, respectively, in the arrangement direction, i.e., the longitudinal direction X. The downstream ridges 23A to 23C are configured to be different in inclination between the side surfaces 23Aa, 23Ab to 23Ca, and 23Cb according to the positions of the downstream ridges 23A to 23C. In the present embodiment, the downstream ridges 23A to 23C are designed so that their heights H are equal to each other and their side surfaces 23Aa, 23Ab to 23Ca, and 23Cb are different in inclination angle. FIG. 9 is an enlarged cross-sectional view of the left downstream ridge 23A in FIG. 8. FIG. 10 is a cross-sectional view of a ridge 43A in a comparative example. The ridge 43A in FIG. 10 has a flat top. In the present embodiment, as shown in FIG. 9, the downstream ridge 23A includes a top having a gently inclined surface or a continuously curved surface. Similarly, the remaining downstream ridges 23B and 23C each have a top configured to be with the downstream ridge 23A.

In the present embodiment, concretely, as shown in FIG. 8, the left downstream ridge 23A includes a first side surface 23Aa on the right side and a second side surface 23Ab on the opposite side, i.e., on the left side in the longitudinal direction X which is the arrangement direction. The central downstream ridge 23B includes a first side surface 23Ba on the right side and a second side surface 23Bb on the left side in the same longitudinal direction X. The right downstream ridge 23C similarly includes a first side surface 23Ca on the right side and a second side surface 23Cb on the left side in the same longitudinal direction X. Herein, as shown in FIG. 8, an inclination angle α1 of the first side surface 23Aa of the downstream ridge 23A with respect to a horizontal line is set gentler (e.g., 30°) than an inclination angle β1 (e.g., 45°) of the second side surface 23Ab. Furthermore, as shown in FIG. 8, an inclination angle α2 of the first side surface 23Ba of the downstream ridge 23B and an inclination angle β2 of the second side surface 23Bb are set equal to the inclination angle α1 of the first side surface 23Aa of the left downstream ridge 23A. As shown in FIG. 8, an inclination angle α3 of the first side surface 23Ca of the downstream ridge 23C is set steeper (e.g., 45°) than an inclination angle β3 (e.g., 30°) of the second side surface 23Cb. With the inclination angles set as above, the first side surfaces 23Aa, 23Ba, and 23Ca and the second side surfaces 23Ab, 23Bb, and 23Cb of the downstream ridges 23A to 23C are inclined at the inclination angles α1 to α3 and β1 to β3 that are changed in sequence from steep to gentle from the ridge at either end (the left or right end in FIG. 8) in the arrangement direction (the longitudinal direction X) toward the ridge at an opposite end (the right or left end) so that the inclination angles α1 to α3 and β1 to β3 are set to be laterally symmetrically arranged as a whole in the arrangement direction (the longitudinal direction X).

(Operations and Effects of the EGR Gas Distributor)

According to the configuration of the EGR gas distributor 1 in the present embodiment described above, the EGR gas introduced into the gas inflow passage 12 through the gas inlet 11 flows through the gas inflow passage 12 by splitting into multiple streams and then collects in the gas chamber 13, and further is distributed to the plurality of branch pipes 4 of the intake manifold 2 through the plurality of gas distribution passages 14A to 14D. The EGR gas distributed to the branch pipes 4 then flows to corresponding cylinders of the engine. Herein, the downstream inner wall of the gas chamber 13 is divided into the plurality of downstream divided walls 21A to 21D and the downstream ridges 23A to 23C are each provided at the boundary between adjacent two of the downstream divided walls 21A to 21D. The plurality of downstream ridges 23A to 23C are arranged side by side according to the number of the gas distribution passages 14A to 14D, and the downstream ridges 23A to 23C include the side surfaces 23Aa, 23Ab to 23Ca, and 23Cb different in inclination angle according to the positions. Even if the EGR gas distributor 1 when mounted in a vehicle is subjected to lateral G (centrifugal force and inertia force) due to turn or other motions of the vehicle and the lateral G changes in magnitude or direction, the downstream ridges 23A to 23C serve to restrict condensed water accumulated on the corresponding downstream divided walls 21A to 21D in the gas chamber 13 from moving by climbing over the downstream ridges 23A to 23C. In addition, the timings at which the condensed water to be restricted moves by climbing over the downstream ridges 23A to 23C deviate from one another between the downstream ridges 23A to 23C due to differences in inclination of the side surfaces 23Aa, 23Ab to 23Ca, and 23Cb. Thus, even if the lateral G (centrifugal force and inertia force) acts on the EGR gas distributor 1 mounted in a vehicle due to turn of other motions of the vehicle and the lateral G changes, the EGR gas distributor 1 can restrain the condensed water in the gas chamber 13 from moving at once in the direction of the lateral G. This can prevent the condensed water from flowing in a specified one or ones of the gas distribution passages 14A to 14D to flow out into a specified one or ones of the cylinders #1 to #4 of an engine.

According to the configuration of the present embodiment, the first side surfaces 23Aa, 23Ba, and 23Ca and the second side surfaces 23Ab, 23Bb, and 23Cb of the downstream ridges 23A to 23C are designed to be inclined at the inclination angles α1 to α3 and β1 to β3 that are changed in sequence from a steep angle to a gentle angle from the downstream ridge 23A or 23C at either end toward the downstream ridge 23C or 23A at the opposite end in the arrangement direction of the downstream ridges 23A to 23C, so that the inclination angles α1 to α3 and β1 to β3 are laterally symmetrically arranged as a whole in the arrangement direction (the longitudinal direction X). Even if the direction of the lateral G acting on the gas chamber 13 changes from forward to reverse or vice versa, the movement timings of the condensed water that climbs over the downstream ridges 23A to 23C deviate from one another between the downstream ridges 23A to 23C. Therefore, even if the direction of the lateral G (centrifugal force and inertia force) acting on the gas chamber 13 changes from forward to reverse or vice versa, the EGR gas distributor 1 can restrain the condensed water in the gas chamber 13 from moving instantly in the direction of the lateral G, thereby preventing the condensed water from flowing to a specified one or ones of the gas distribution passages 14A to 14D to flow out into a specified one or ones of the cylinders #1 to #4 of an engine.

Figure 11:
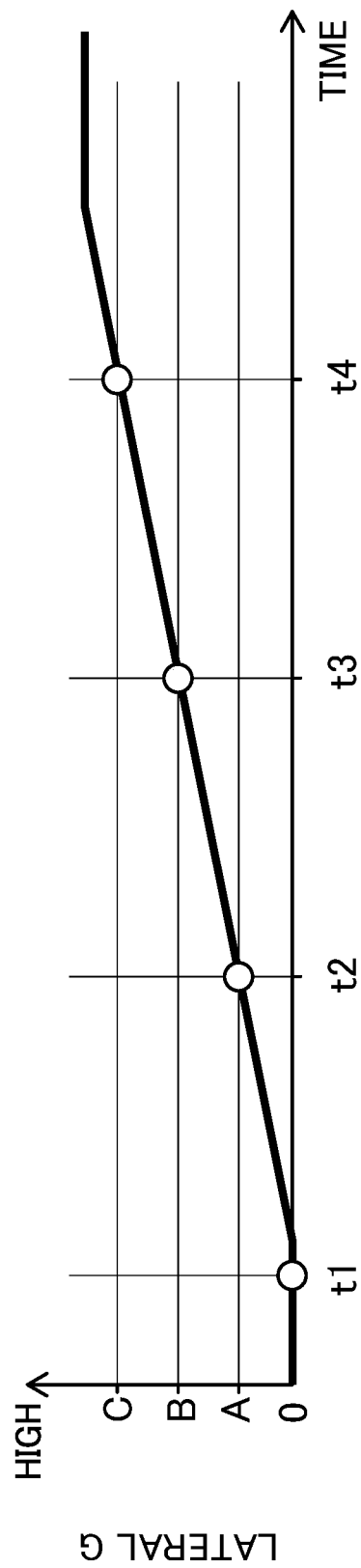
FIG. 11 is a graph showing temporal change in lateral G that acts on the gas chamber in the first embodiment.

Herein, the movement of condensed water caused by changing of the lateral G acting on the gas chamber 13 when for example the vehicle turns or the vehicle does not turn will be described below. FIG. 11 is a graph showing temporal changes in lateral G (centrifugal force and inertia force) occurring when the lateral G acts on the gas chamber 13. The lateral G in this case points to a direction from the gas distribution passage 14D corresponding to the first cylinder #1 to the gas distribution passage 14D corresponding to the fourth cylinder #4. FIGS. 12 to 22 are cross-sectional views showing various behaviors of condensed water in the gas chamber 13 according to changing of the lateral G.

Figure 12:
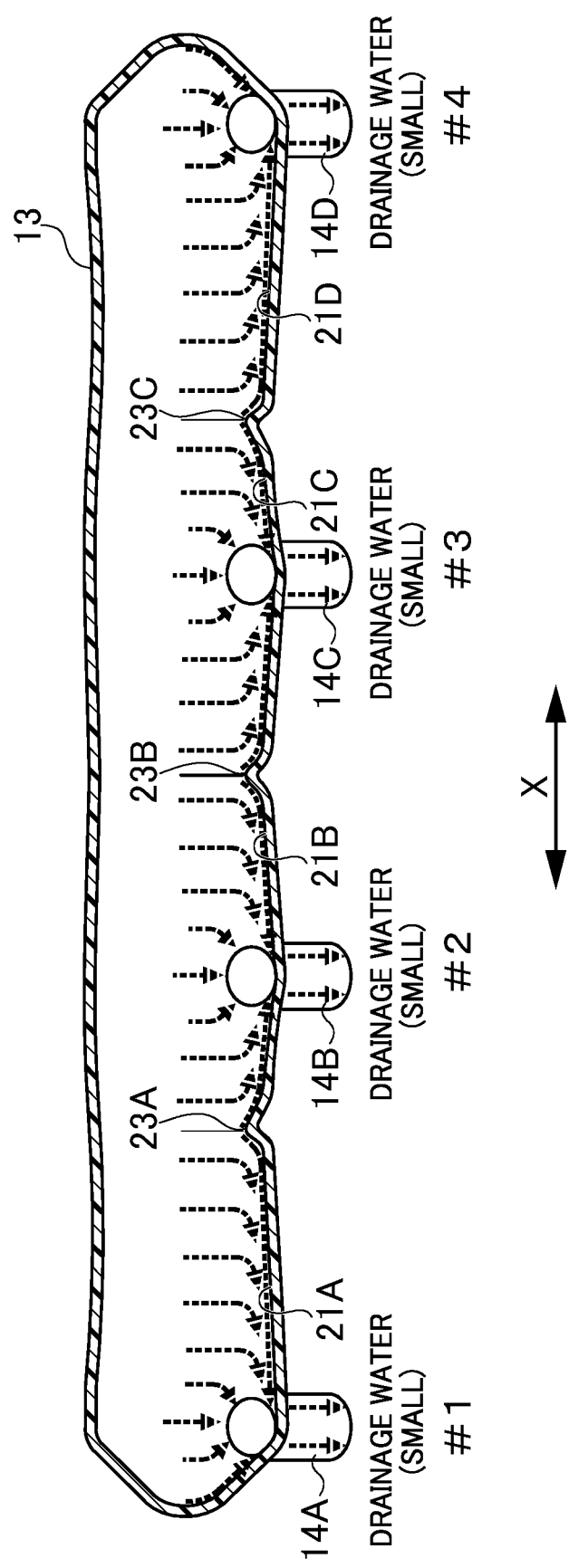
FIG. 12 is a cross-sectional view showing a flow of condensed water in the gas chamber when a lateral G is 0 in the first embodiment.
Figure 13:
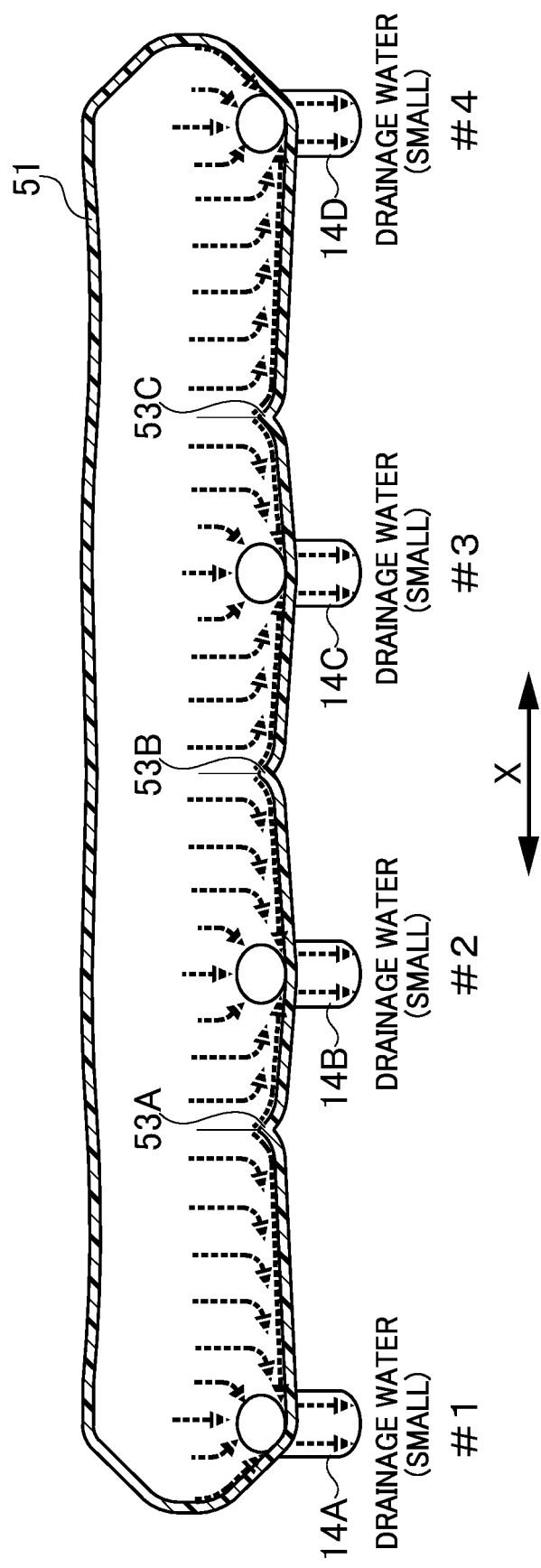
FIG. 13 is a cross-sectional view showing a flow of condensed water in the gas chamber when the lateral G is 0 in a comparative example to the first embodiment.

The case where the lateral G is 0 at time t1 in FIG. 11, that is, the lateral G does not act on the gas chamber 13 will be firstly described below. FIG. 12 is a cross-sectional view showing a flow of condensed water (indicated by arrows) in the gas chamber 13 at time t1. FIG. 13 is a cross-sectional view showing a flow of condensed water (indicated by arrows) in a gas chamber 51 at time t1 in a comparative example.

In FIG. 13, three downstream ridges 53A 53B, and 53C are identical in shape and size to the central downstream ridge 23B in the present embodiment. In FIGS. 12 and 13, the upstream ridges of the gas chambers 13 and 51 are not illustrated for convenience. The same applies to FIGS. 14, 16, 17, 19, 20, and 22 which will be described later. For the lateral G of 0, as indicated by arrows in FIGS. 12 and 13, the condensed water stuck on the inner walls of the gas chambers 13 and 51 flows downward naturally, i.e., by gravity, along the inner walls and uniformly flows toward each of the gas distribution passages 14A to 14D, then flows out into the corresponding cylinders #1 to #4. In this case, a small amount of drainage water is evenly discharged out through the gas distribution passages 14A to 14D.

Figure 14:
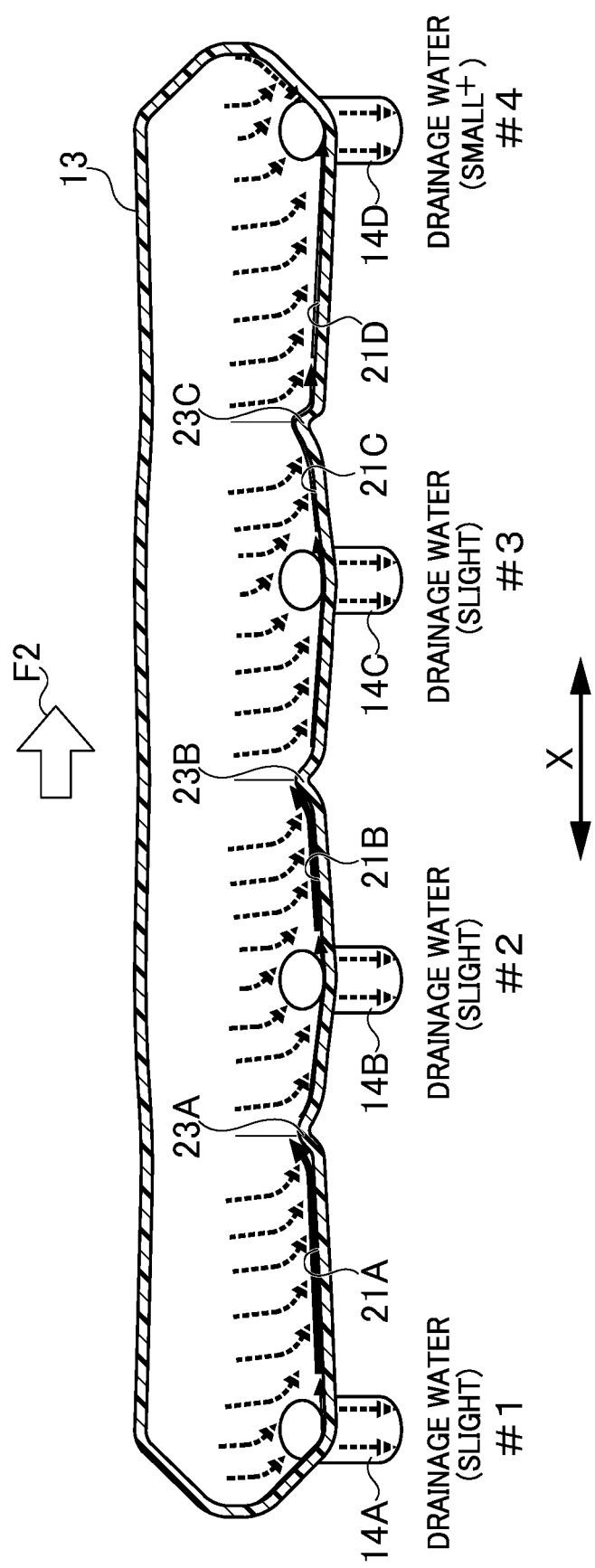
FIG. 14 is a cross-sectional view showing a flow of condensed water in the gas chamber when the lateral G is a predetermined value A (low) in the first embodiment.
Figure 15:
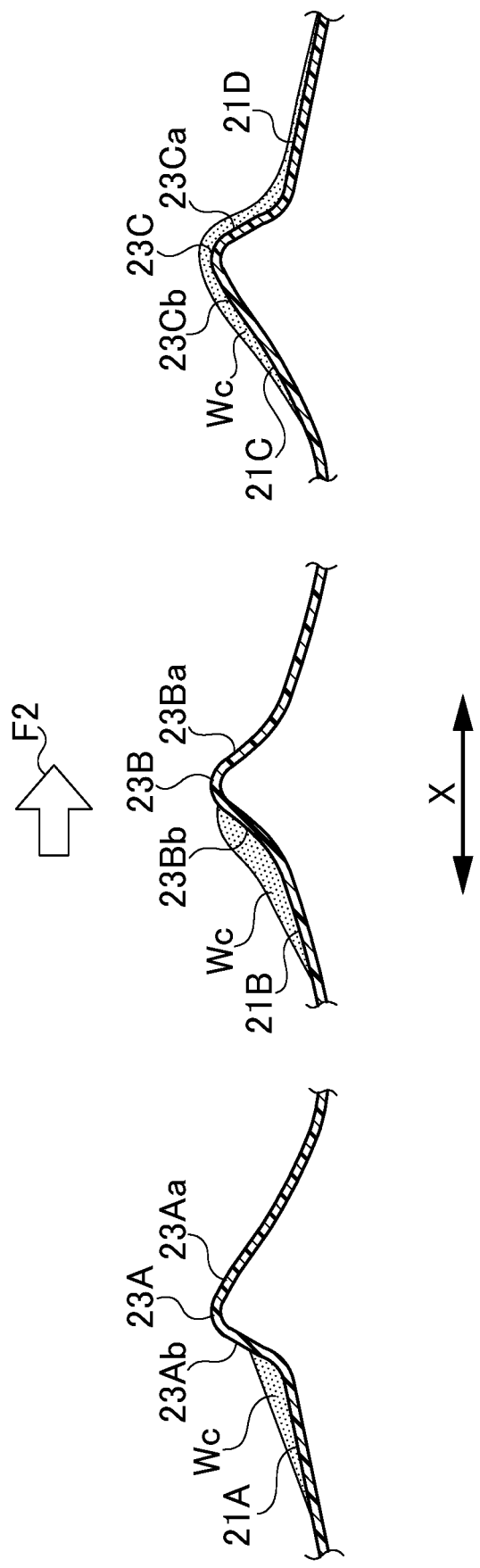
FIG. 15 is a cross-sectional view showing a flow of condensed water on each downstream ridge when the lateral G is the predetermined value A (low) in the first embodiment.
Figure 16:
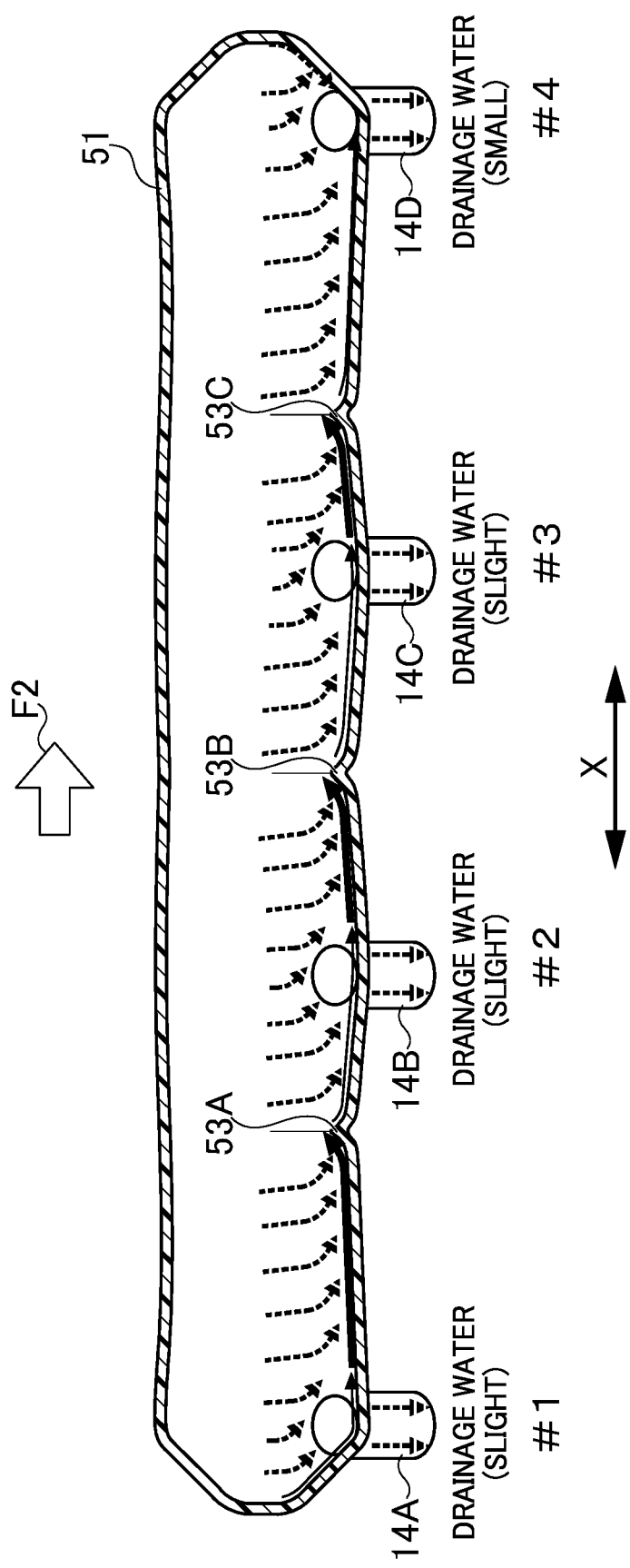
FIG. 16 is a cross-sectional view showing a flow of condensed water in the gas chamber when the lateral G is the predetermined value A (low) in the comparative example to the first embodiment.

Next, the case where the lateral G increased to a predetermined value A (low) at time t2 in FIG. 11 will be described below. FIG. 14 is a cross-sectional view showing a flow of condensed water (indicated by arrows) in the gas chamber 13 at time t2 in the present embodiment. FIG. 15 is a cross-sectional view showing a flow of condensed water (indicated by arrows) on each of the downstream ridges 23A to 23C at time t2 in the present embodiment. FIG. 16 is a cross-sectional view showing a flow of condensed water (indicated by arrows) in the gas chamber 51 at time t2 in the comparative example. As indicated by the arrows in FIGS. 14 and 16, the condensed water stuck on the inner walls of the gas chambers 13 and 51 flows slightly obliquely downward along the inner walls in the direction of lateral G (indicated by an arrow F2).

Herein, in the gas chamber 13 in the present embodiment, the condensed water Wc accumulates, or remains, on the left downstream ridge 23A and the central downstream ridge 23B as shown in FIGS. 14 and 15. In contrast, a part of the condensed water Wc accumulated on the downstream divided wall 21C including the inlet of the gas distribution passage 14C corresponding to the third cylinder #3 climbs over the right downstream ridge 23C to flow onto the adjacent downstream divided wall 21D and hence flows toward the gas distribution passage 14D corresponding to the fourth cylinder #4 as shown in FIGS. 14 and 15. In this case, a slight amount of drainage water is discharged out through each of the gas distribution passages 14A to 14C respectively corresponding to the first cylinder #1 to third cylinder #3. The drainage water discharged out through the gas distribution passage 14D corresponding to the fourth cylinder #4 slightly increases to a small amount, but does not cause misfire of an engine. In contrast, in the gas chamber 51 in the comparative example, the condensed water accumulates on each of the downstream ridges 53A to 53C as shown in FIG. 16. In this case, a slight amount of of drainage water is discharged through each of the gas distribution passages 14A to 14C respectively corresponding to the first cylinder #1 to third cylinder #3, and a small amount of drainage water is discharged through the gas distribution passage 14D corresponding to the fourth cylinder #4.

Figure 17:
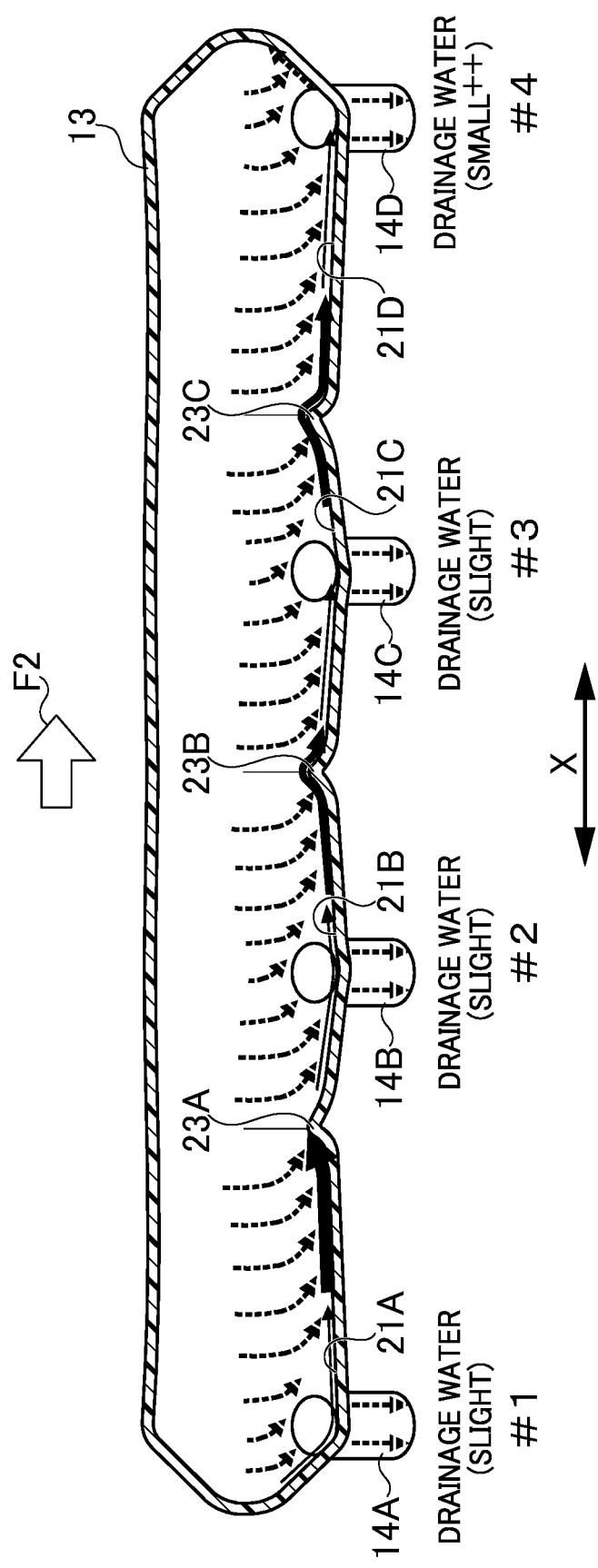
FIG. 17 is a cross-sectional view showing a flow of condensed water in the gas chamber when the lateral G is a predetermined value B (medium) in the first embodiment.
Figure 18:
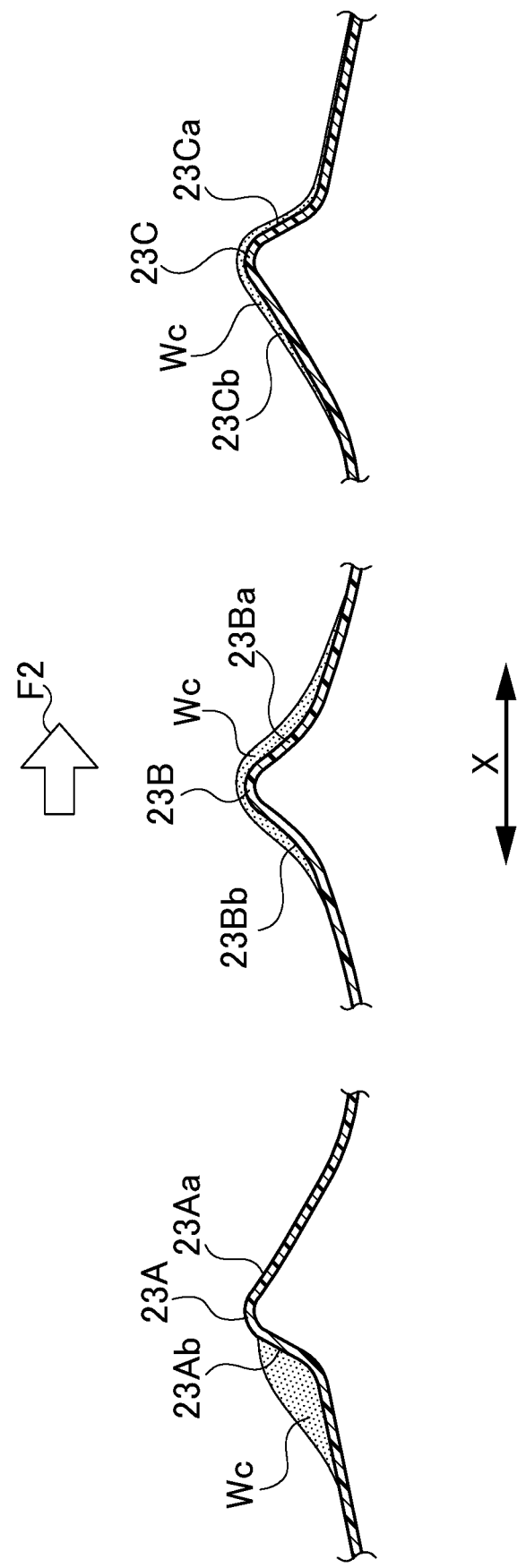
FIG. 18 is a cross-sectional view showing a flow of condensed water on each downstream ridge when the lateral G is the predetermined value B (medium) in the first embodiment.
Figure 19:
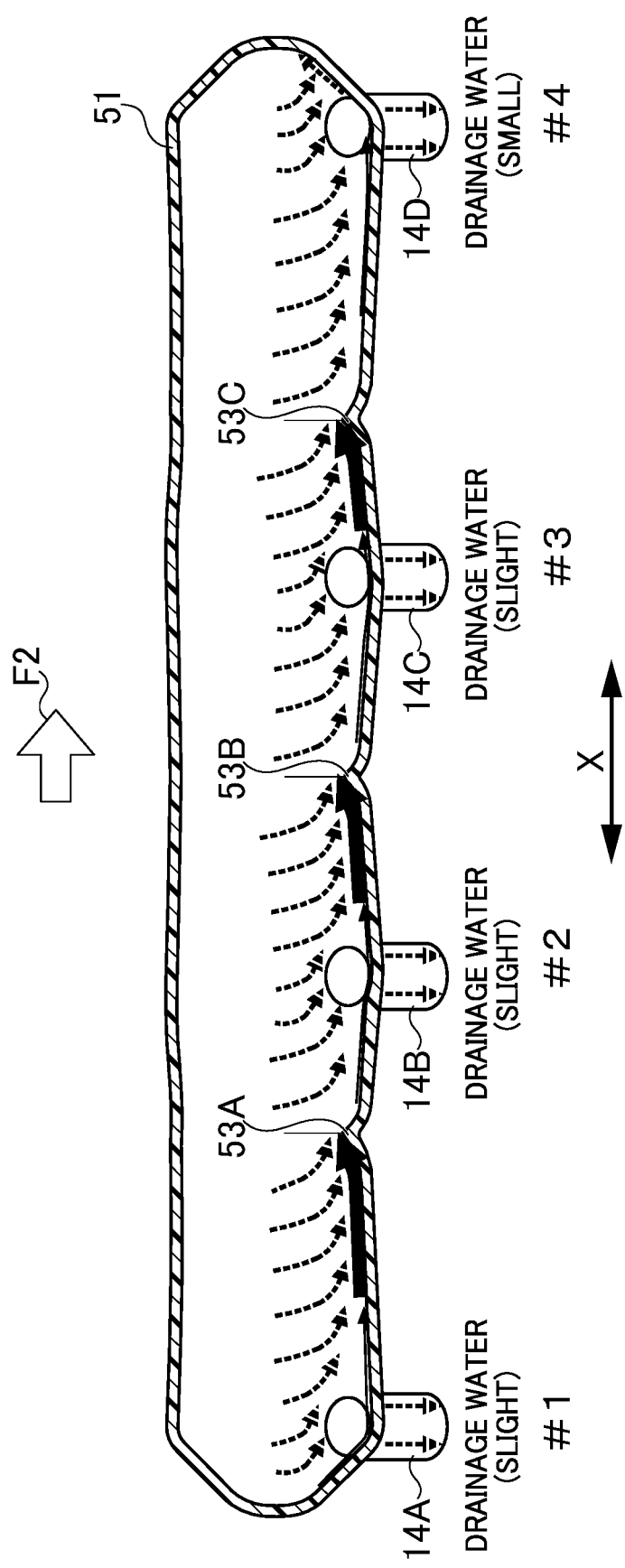
FIG. 19 is a cross-sectional view showing a flow of condensed water in the gas chamber when the lateral G is the predetermined value B (medium) in the comparative example to the first embodiment.

Next, the case where the lateral G increased to a predetermined value B (medium) at time t3 in FIG. 11 will be described below. FIG. 17 is a cross-sectional view showing a flow of condensed water (indicated by arrows) in the gas chamber 13 at time t3 in the present embodiment. FIG. 18 is a cross-sectional view showing a flow of condensed water Wc (indicated by arrows) on each of the downstream ridges 23A to 23C at time t3 in the present embodiment. FIG. 19 is a cross-sectional view showing a flow of condensed water (indicated by arrows) at time t3 in the gas chamber 51 in the comparative example. As indicated by the arrows in FIGS. 17 and 19, the condensed water stuck on the inner walls of the gas chambers 13 and 51 flows obliquely downward along the inner walls in the direction of lateral G (indicated by an arrow F2). Herein, in the gas chamber 13 in the present embodiment, the condensed water Wc accumulates on the left downstream ridge 23A as shown in FIGS. 17 and 18. This accumulation amount will increase. The condensed water Wc accumulated on the downstream divided walls 21B and 21C including the inlets of the gas distribution passages 14B and 14C respectively corresponding to the second cylinder #2 and third cylinder #3 climbs over the central downstream ridge 23B and the right downstream ridge 23C to flow onto the downstream divided walls 21C and 21D, and hence flows toward the gas distribution passages 14C and 14D respectively corresponding to the third cylinder #3 and the fourth cylinder #4 as shown in FIGS. 17 and 18. Here, the condensed water has climbed over the right downstream ridge 23C since when the lateral G is the predetermined value A (low), so that an inflow amount of condensed water per time allowed to flow in the fourth cylinder #4 is small. In this case, a slight amount of drainage water is discharged out through each of the gas distribution passages 14A to 14C respectively corresponding to the first cylinder #1 to third cylinder #3. The drainage water discharged out through the gas distribution passage 14D corresponding to the fourth cylinder #4 slightly increases to a small amount, but does not cause misfire of an engine. In contrast, in the gas chamber 51 in the comparative example, the condensed water accumulates on each of the downstream ridges 53A to 53C as shown in FIG. 19. This accumulation amount will increase. In this case, a slight amount of drainage water is discharged out through the gas distribution passages 14A to 14C respectively corresponding to the first cylinder #1 to third cylinder #3, and a small amount of drainage water is discharged out through the gas distribution passage 14D corresponding to the fourth cylinder #4.

Figure 20:
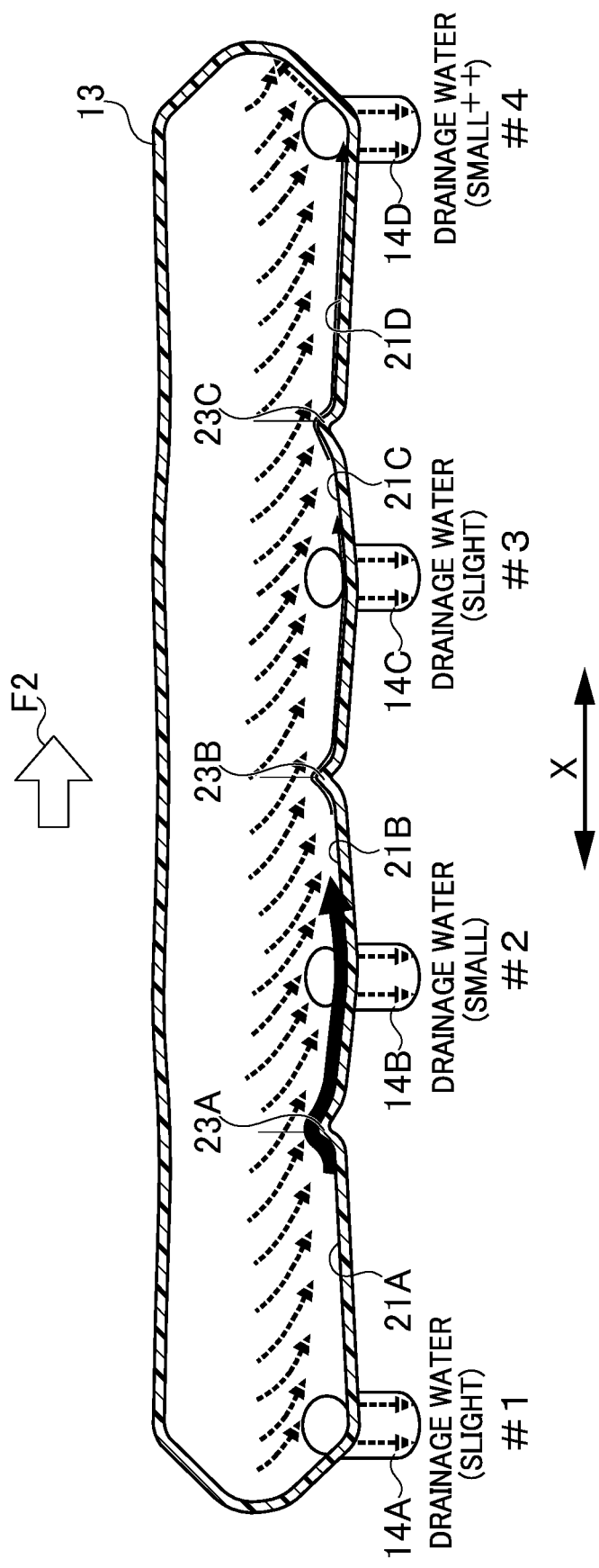
FIG. 20 is a cross-sectional view showing a flow of condensed water in the gas chamber when the lateral G is a predetermined value C (high) in the first embodiment.
Figure 21:
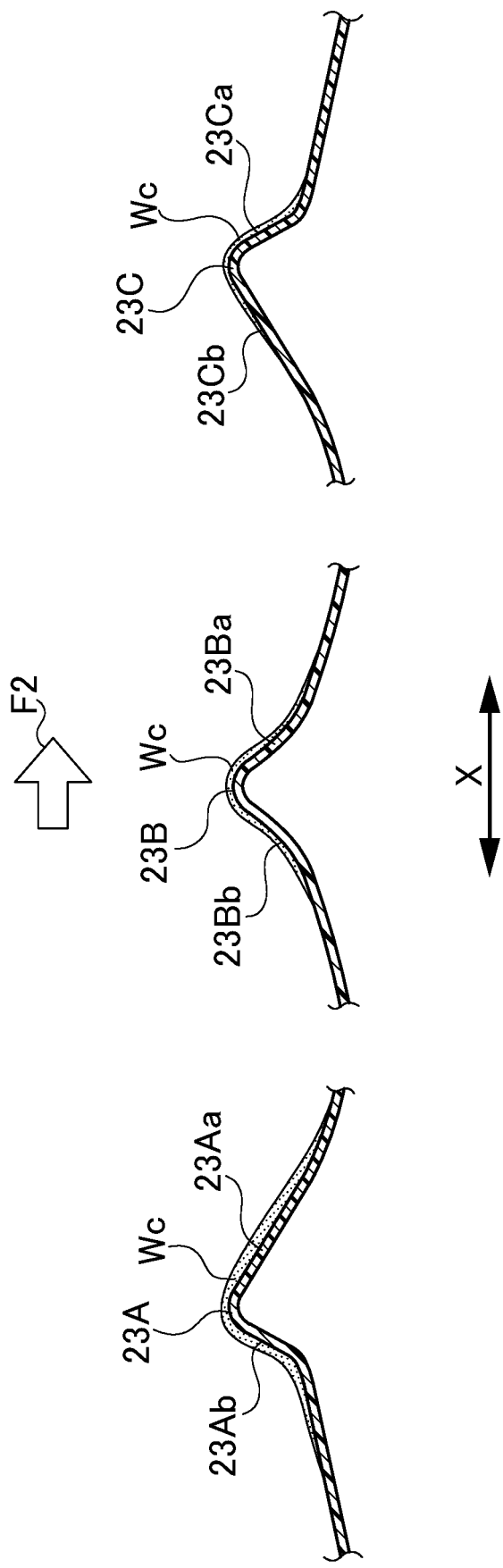
FIG. 21 is a cross-sectional view showing a flow of condensed water on each downstream ridge when the lateral G is the predetermined value C (high) in the first embodiment.
Figure 22:
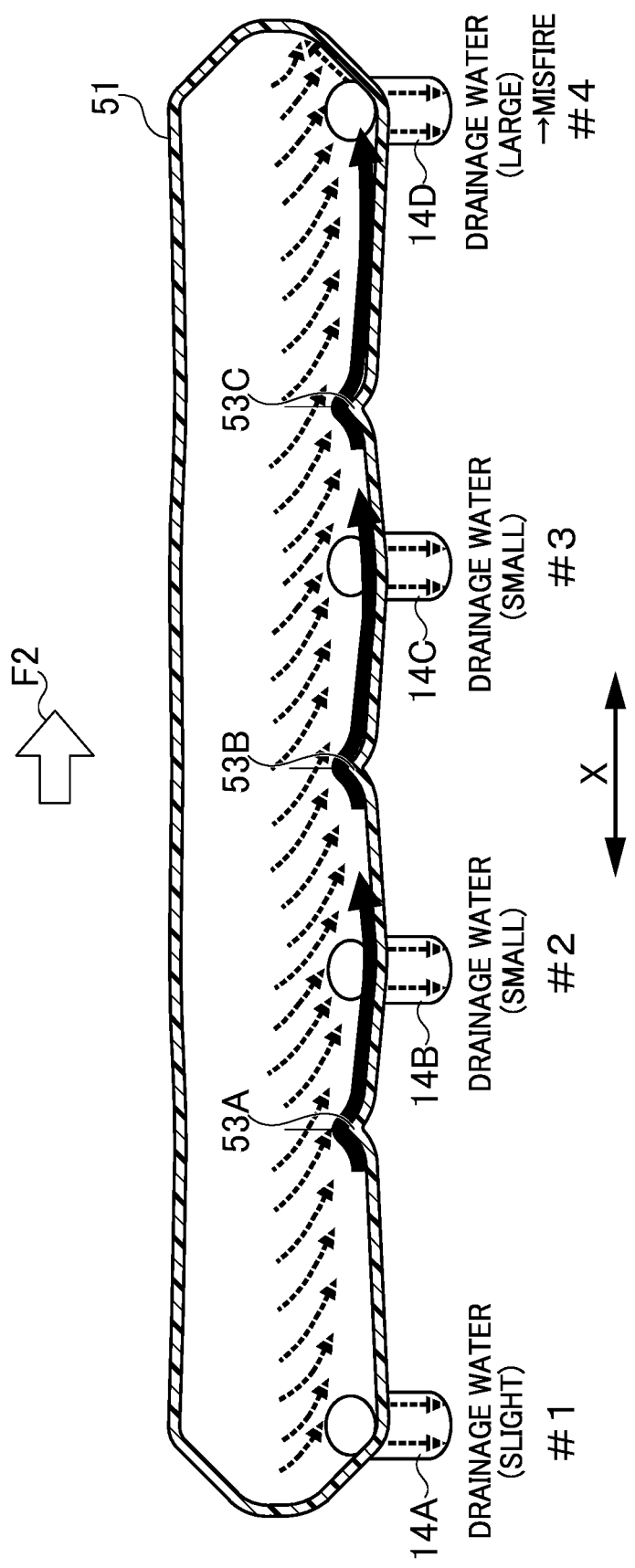
FIG. 22 is a cross-sectional view showing a flow of condensed water in the gas chamber when the lateral G is the predetermined value C (high) in the comparative example to the first embodiment.

Next, the case where the lateral G increased to a predetermined value C (high) at time t4 in FIG. 11 will be described below. FIG. 20 is a cross-sectional view showing a flow of condensed water (indicated by arrows) in the gas chamber 13 at time t4 in the present embodiment. FIG. 21 is a cross-sectional view showing a flow of condensed water Wc (indicated by arrows) on each of the downstream ridges 23A to 23C at time t4 in the present embodiment. FIG. 22 is a cross-sectional view showing a flow of condensed water (indicated by arrows) at time t4 in the gas chamber 51 in the comparative example. As indicated by the arrows in FIGS. 20 and 22, the condensed water stuck on the inner walls of the gas chambers 13 and 51 flows down at a steep slant in the direction of lateral G (indicated by an arrow F2) along the inner walls. Here, in the gas chamber 13 in the present embodiment, regarding the downstream ridges 23A to 23C, the condensed water Wc climbs over each of the downstream ridges 23A to 23C to flow onto the adjacent downstream divided walls 21B to 21D as shown in FIGS. 20 and 21. Here, part of a large amount of condensed water having climbed over the left downstream ridge 23A further climbs over the central downstream ridge 23B and the right downstream ridge 23C under the lateral G. Similarly, part of the condensed water having climbed over the central downstream ridge 23B further climbs over the right downstream ridge 23C under the lateral G. Accordingly, the condensed water having climbed over the downstream ridges 23A and 23B dispersedly flows to the gas distribution passages 14B to 14D respectively corresponding to the second cylinder #2 to fourth cylinder #4. Here, regarding the central downstream ridge 23B, the condensed water has climbed over this downstream ridge 23B since when the lateral G is the predetermined value B (medium), so that an inflow amount of condensed water per time allowed to flow in the third cylinder #3 is small. Similarly, regarding the right downstream ridge 23C, the condensed water has climbed over this downstream ridge 23C since when the lateral G is the predetermined value A (low), so that an inflow amount of condensed water per time allowed to flow in the fourth cylinder #4 is small. In this case, a slight amount of drainage water is discharged out through the gas distribution passage 14A corresponding to the first cylinder #1, a small amount of drainage water is discharged out through the gas distribution passage 14B corresponding to the second cylinder #2, and a slight amount of drainage water is discharged out through the gas distribution passage 14C corresponding to the third cylinder #3. The drainage water discharged out through the gas distribution passage 14D corresponding to the fourth cylinder #4 slightly increases to a small amount, but does not cause misfire of an engine. In contrast, in the gas chamber 51 in the comparative example, as shown in FIG. 22, a large amount of accumulated condensed water climbs over the downstream ridges 53A to 53C in sequence and thus concentrically flows at once toward the gas distribution passage 14D corresponding to the fourth cylinder #4. In this case, a slight amount of drainage water is discharged out through the gas distribution passage 14A corresponding to the first cylinder #1, a small amount of drainage water is discharged out through the gas distribution passage 14B corresponding to the second cylinder #2, and a small amount of drainage water is discharged out through the gas distribution passage 14C corresponding to the third cylinder #3. The drainage water discharged out through the gas distribution passage 14D corresponding to the fourth cylinder #4 increases to a large amount, which may cause misfire in the fourth cylinder #4.

As is clear from the above description, according to the configuration of the gas chamber 51 in the comparative example, when the lateral G increases (changes) from 0 to the predetermined value C (high), the condensed water in the gas chamber 51 finally concentrically flows at once to the gas distribution passage 14D corresponding to the specified fourth cylinder #4. In contract, according to the configuration of the gas chamber 13 in the present embodiment, even if the lateral G increases (changes) from 0 to the predetermined value C (high), the condensed water in the gas chamber 13 is prevented from finally concentrically flowing at once to the gas distribution passage 14D corresponding to the fourth cylinder #4.

According to the present embodiment configured as above, as shown in FIG. 9, the top of each of the downstream ridges 23A to 23C has a gently inclined or continuously curved surface. When the condensed water Wc accumulated on the downstream divided wall 21A becomes saturated and the lateral G acts in a specified direction indicated by the arrow F2, the condensed water Wc moves by gradually climbing over the top of the each of the downstream ridges 23A to 23C as indicated a broken line in FIG. 9. Accordingly, this configuration can further suppress the condensed water Wc in a saturated state from moving by climbing over the top of the downstream ridge 23A at once. In contrast, in the comparative example shown in FIG. 10, the condensed water Wc in a saturated state is likely to climb over the top of the downstream ridge 53A at once.

According to the configuration of the present embodiment, EGR gas finally collects in the gas chamber 13. Thus, an appropriate amount of EGR gas necessary for distribution collects once in the gas chamber 13 and then is distributed to the gas distribution passages 14A to 14D. This configuration can distribute EGR gas to each of the gas distribution passages 14A to 14D without excess or deficiency.

According to the configuration of the present embodiment, the gas inflow passage 12 is configured such that the first gas passage part 12a connects to the first joining part 16 so as to be perpendicular to the second gas passage part 12b. The part of the second gas passage part 12b including the first joining part 16 has a curved shape convexly protruding in the flowing direction of EGR gas flowing from the first gas passage part 12a. Similarly, the second gas passage part 12b (the first branch passage part 12ba and the second branch passage part 12bb) connects to the second joining part 17 and the third joining part 18 so as to be perpendicular to the gas chamber 13. Furthermore, the part of the the gas chamber 13 including the second joining part 17 and the third joining part 18 has a curved shape convexly protruding in the flowing direction of EGR gas flowing from the second gas passage part 12b. Accordingly, in the curved portion of the second gas passage part 12b convexly protruding as above, as shown in FIG. 3, the first portion P1 connected to the downstream end of the first gas passage part 12a is recessed, so that the first gas passage part 12a has an increased passage length by just that much. Similarly, in the curved portions of the gas chamber 13 convexly protruding as above, the second portion P2 and the third portion P3 connected to the downstream ends of the second gas passage part 12b are recessed, so that the second gas passage part 12b (i.e., the first branch passage part 12ba and the second branch passage part 12bb) has an increased passage length by just that much. Accordingly, the EGR gas distributor 1 can effectively rectify EGR gas through the gas inflow passage 12 and the gas chamber 13 without the need to increase the size of the EGR gas distributor 1, thus enhancing distributivity of EGR gas. In addition, as compared with the conventional EGR gas distributor, the EGR gas distributor 1 in the present embodiment can exert a secondary effect that reduces pressure loss of EGR gas.

Second Embodiment

A second embodiment of the EGR gas distributor will be described with reference to accompanying drawings.

In the following description, similar or identical parts to those in the first embodiment will be assigned the same reference signs as in the first embodiment without repeating the details thereof, and differences from the first embodiment will be focused.

Figure 23:
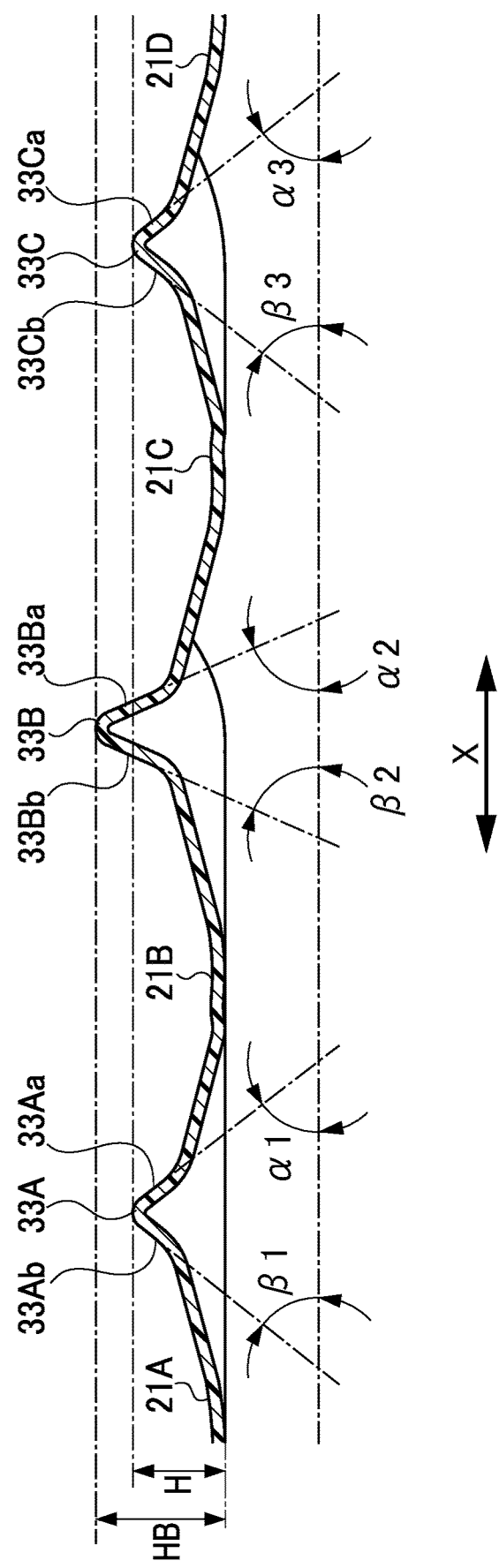
FIG. 23 is a cross-sectional view illustrating a gas chamber in a second embodiment, corresponding to FIG. 8.
Figure 24:
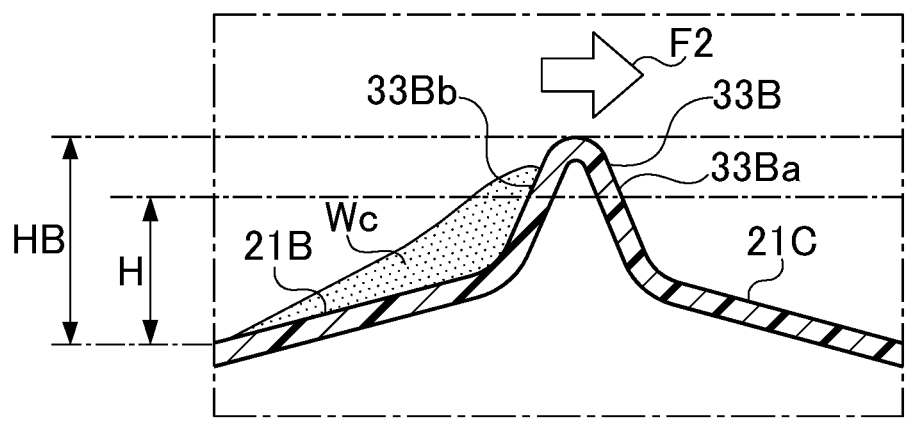
FIG. 24 is an enlarged cross-sectional view of a central downstream ridge in the second embodiment.
Figure 25:
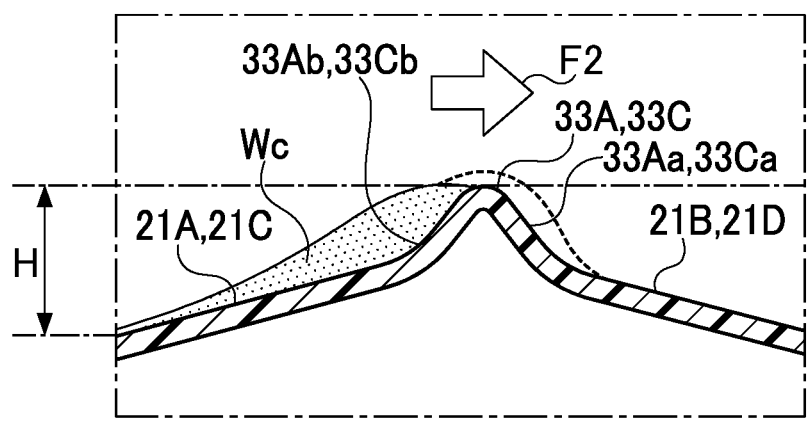
FIG. 25 is an enlarged cross-sectional view of left or right downstream ridges in the second embodiment.
Figure 26:
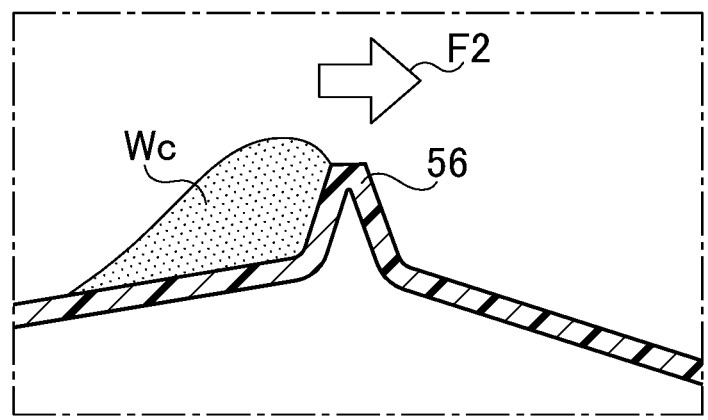
FIG. 26 is a cross-sectional view showing a relationship between a ridge provided on an inner surface of an EGR chamber and condensed water in a conventional art.
Figure 27:
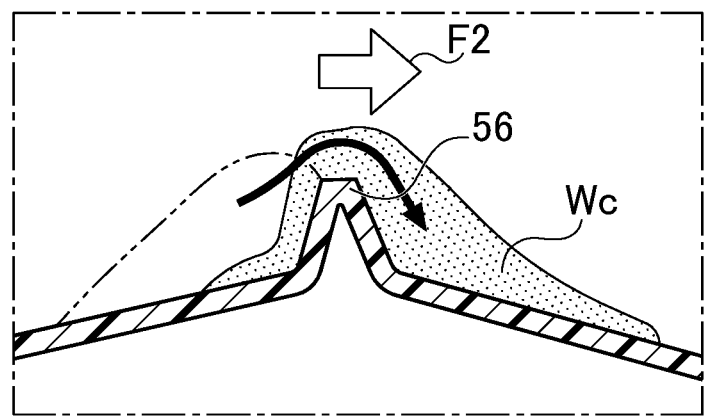
FIG. 27 is a cross-sectional view showing the relationship between the ridge provided on the inner surface of the EGR chamber and condensed water in the conventional art.

The second embodiment differs from the first embodiment in the configuration of the downstream ridges 23A to 23C. FIG. 23 illustrates the gas chamber 13 in a cross-sectional view corresponding to FIG. 8. FIG. 24 is an enlarged cross-sectional view of the central downstream ridge 33B in the second embodiment. FIG. 25 is an enlarged cross-sectional view of the left downstream ridge 33A and the right downstream ridge 33C in the second embodiment. In this embodiment, as shown in FIGS. 23 to 25, the height HB of the central downstream ridge 33B is set higher than the height H of each of the remaining downstream ridges 33A and 33C. Specifically, a plurality of (three) downstream ridges 33A to 33C is designed to be higher in sequence from the downstream ridge 33A or 33C at either end (a left side or a right side in FIG. 8) toward the central downstream ridge 33B in the arrangement direction (the longitudinal direction X) thereof. Other configurations are identical to those in the first embodiment. Furthermore, as shown in FIGS. 23 to 25, each of the downstream ridges 33A to 33C has a symmetrical shape as shown in FIGS. 23 and 25. The inclination angle α1 of the first side surface 33Aa of the left downstream ridge 33A and the inclination angle α3 of the first side surface 33Ca of the right downstream ridge 33C are set equal to the inclination angle β1 of the second side surface 33Ab and the inclination angle β3 of the second side surface 33Cb; that is, the angles α1, α3, β1, and β3 are the same angle. However, the inclination angle α2 of the side surface 33Ba and the inclination angle β2 of the side surface 33Bb of the central downstream ridge 33B are set steeper than those of the downstream ridges 33A and 33C.

(Operations and Effects of the EGR Gas Distributor)

According to the configuration of the EGR gas distributor 1 in the second embodiment described as above, the three downstream ridges 33A to 33C are designed to be higher in sequence from the left downstream ridge 33A and the right downstream ridge 33C toward the central downstream ridge 33B in the arrangement direction (the longitudinal direction X) thereof. Thus, even if the direction of the lateral G (centrifugal force and inertia force) acting on the gas chamber 13 changes from forward to reverse or vice versa, the movement timings of the condensed water that climbs over each of the downstream ridges 33A to 33C deviate from one another between the downstream ridges 33A to 33C. Specifically, the left downstream ridge 33A and the right downstream ridge 33C are relatively low in height as shown in FIG. 25, so that the saturation limit of condensed water Wc is low. When the lateral G acts on the gas chamber 13 in the direction of the arrow F2, therefore, a part of the condensed water Wc having accumulated since when the lateral G is low climbs over the downstream ridges 33A and 33C and overflows. In contrast, the central downstream ridge 33B has a relatively high height HB as shown in FIG. 24 and thus the saturation limit of condensed water Wc is high. Accordingly, even when the lateral G acts on the gas chamber 13 in the direction of the arrow F2, the condensed water Wc having accumulated since when the lateral G is low is retained without climbing over the downstream ridge 33B. In the present embodiment, therefore, while the lateral G acting on the gas chamber 13 in the direction of the arrow F2 is low, the condensed water having accumulated on the downstream divided wall 21A corresponding to the left gas distribution passage 14A partly climbs over the downstream ridge 33A and is distributed to the adjacent downstream divided wall 21B corresponding to the gas distribution passage 14B. Subsequently, as the lateral G increases, a part of the condensed water Wc having accumulated on the downstream divided wall 21B corresponding to the gas distribution passage 14B climbs over the central downstream ridge 33B and overflows, flowing to the adjacent downstream divided wall 21C. However, while the lateral G is low, the condensed water flowing onto the downstream divided walls 21B and 21D flows out before the lateral G becomes high to the corresponding gas distribution passages 14B and 14D. Thus, when the lateral G becomes high, the amount of condensed water caused to climb over the right downstream ridge 33C to flow at once in the downstream divided wall 21D decreases. The same applies to the left downstream divided wall 21A when the lateral G changes to a reverse direction. Even when the lateral G (centrifugal force and inertia force) acting on the gas chamber 13 changes in direction, from forward to reverse or vice versa, the foregoing configuration in the present embodiment can suppress the condensed water in the gas chamber 13 from moving at once in the direction of lateral G. This configuration can prevent the condensed water from flowing to a specified one or ones of the gas distribution passages 14A to 14D to flow out into a specified one or ones of the cylinders #1 to #4 of an engine. Other operations and effects are the same as those in the first embodiment.

The foregoing embodiments are mere examples and give no limitation to the present disclosure. The present disclosure may be embodied in other specific forms without departing from the essential characteristics thereof.

(1) Each of the foregoing embodiments exemplifies the EGR gas distributor 1 provided with four gas distribution passages 14A to 14D for a 4-cylinder engine and three downstream ridges 23A to 23C and 33A to 33C. As an alternative, an EGR gas distributor may be provided with the number of gas distribution passages and the number of downstream ridges corresponding to a multicylinder engine other than the 4-cylinder engine.

(2) In the first embodiment, the plurality of downstream ridges 23A to 23C are designed to be different in inclination between the side surfaces 23Aa, 23Ab to 23Ca, and 23Cb according to the positions of the downstream ridges 23A to 23C. In the second embodiment, the plurality of downstream ridges 23A to 23C are designed to be different in height H from each other according to the positions of the downstream ridges 23A to 23C. As an alternative, both the height and the inclination angle of the side surfaces may be set different according to the positions of the downstream ridges.

(3) In each of the foregoing embodiments, the gas chamber 13 has a zigzag form in plan view. As another example, the gas chamber may be designed with a straight form in plan view.

(4) In each of the foregoing embodiments, the EGR gas distributor 1 is made up of a single casing, but may be integrally made up of an upper casing and a lower casing.

(5) In each of the foregoing embodiments, the EGR gas distributor 1 is produced in advance separately from the intake manifold 2 and retrofitted onto the intake manifold 2. As an alternative, the EGR gas distributor may be configured integrally with an intake manifold in advance.

INDUSTRIAL APPLICABILITY

The present disclosure is utilizable to an EGR apparatus to be mounted in a gasoline engine and a diesel engine.

| Reference Signs List | |
|---|---|
| 1 | EGR gas distributor |
| 2 | Intake manifold |
| 4 | Branch pipe |
| 12 | Gas inflow passage |
| 13 | Gas chamber |
| 14A to 14D | Gas distribution passage |
| 21A to 21D | Downstream-side divided wall |
| 23A, 23B, 23C, 33A, 33B, 33C | Downstream-side ridge |
| 23Aa, 23Ba, 23Ca, 33Aa, 33Ba, 33Ca | First side surface |

| Reference Signs List | |
|---|---|
| 23Ab, 23Bb, 23Cb, 33Ab, 33Bb, 33Cb | Second side surface |
| H, HB | Height |
| α1 to α3 | Angle of inclination |
| β1 to β3 | Angle of inclination |

What is claimed is:

1. An EGR gas distributor configured to distribute EGR gas to each of a plurality of branch pipes constituting an intake manifold, the EGR gas distributor comprising:
 a gas chamber configured to collect EGR gas;
 a gas inflow passage provided on an upstream side of the gas chamber and configured to introduce EGR gas into the gas chamber;
 a plurality of gas distribution passages arranged side by side on a downstream side of the gas chamber and configured to distribute the EGR gas from the gas chamber into the plurality of branch pipes,
 the gas chamber including an inner wall on the downstream side, the inner wall being divided into a plurality of downstream divided walls corresponding to the plurality of gas distribution passages in a one-to-one relation, and the inner wall including a plurality of ridges each having a predetermined height at a boundary between adjacent two of the downstream divided walls, and the ridges extending in a direction perpendicular to an arrangement direction of the gas distribution passages,
 wherein the plurality of ridges are arranged side by side according to the number of the gas distribution passages, each of the ridges including side surfaces inclined at a predetermined inclination angle in an arrangement direction of the ridges, the ridges being different from each other in at least one of the height and the inclination angle of the side surfaces according to positions of the ridges in the arrangement direction.

2. The EGR gas distributor according to claim 1, wherein the side surfaces of each of the ridges include a first side surface and a second side surface opposite the first side surface, and
 the ridges are configured such that the first side surfaces and the second side surfaces are inclined at the inclination angles that are changed from steep to gentle in sequence from the ridge located at either end toward the ridge located at an opposite end in the arrangement direction so that the inclination angles are laterally symmetrically arranged as a whole in the arrangement direction.

3. The EGR gas distributor according to claim 1, wherein the ridges are configured to be higher in sequence from the ridge located at either end toward the ridge located in a center in the arrangement direction of the ridges.

4. The EGR gas distributor according to claim 1, wherein each of the ridges has a top having a gently inclined surface or a continuously curved surface.

5. The EGR gas distributor according to claim 2, wherein each of the ridges has a top having a gently inclined surface or a continuously curved surface.

6. The EGR gas distributor according to claim 3, wherein each of the ridges has a top having a gently inclined surface or a continuously curved surface.

* * * * *